United States Patent
Koyama et al.

(10) Patent No.: US 10,796,415 B2
(45) Date of Patent: Oct. 6, 2020

(54) IMAGE PROCESSING DEVICE, DISPLAY DEVICE, NAVIGATION SYSTEM, AND IMAGE PROCESSING METHOD

(71) Applicant: PANASONIC INTELLECTUAL PROPERTY MANAGEMENT CO., LTD., Osaka (JP)

(72) Inventors: Takayoshi Koyama, Osaka (JP); Makoto Funabiki, Osaka (JP); Chisato Yamashita, Osaka (JP); Keiichiro Obayashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/230,720

(22) Filed: Dec. 21, 2018

(65) Prior Publication Data

US 2019/0206029 A1 Jul. 4, 2019

(30) Foreign Application Priority Data

Dec. 28, 2017 (JP) ................. 2017-254585

(51) Int. Cl.
*G06T 5/00* (2006.01)
*G06T 7/536* (2017.01)
(Continued)

(52) U.S. Cl.
CPC .......... *G06T 5/003* (2013.01); *G01C 21/3602* (2013.01); *G01C 21/3676* (2013.01);
(Continued)

(58) Field of Classification Search
CPC ......... G06T 5/003; G06T 11/00; G06T 7/536; G06T 11/60; G06T 2207/20192;
(Continued)

(56) References Cited

U.S. PATENT DOCUMENTS

| 2005/0143889 | A1* | 6/2005 | Isaji | ...................... G08G 1/161 |
| | | | | 701/70 |
| 2007/0233370 | A1 | 10/2007 | Asada | |

(Continued)

FOREIGN PATENT DOCUMENTS

| JP | 10-132598 | 5/1998 |
| JP | 2007-193652 | 8/2007 |

(Continued)

*Primary Examiner* — William A Beutel
(74) *Attorney, Agent, or Firm* — Greenblum & Bernstein, P.L.C.

(57) ABSTRACT

An image processing device includes: a first obtainer that obtains a captured image from an imaging device that captures a view in front of a vehicle; a second obtainer that obtains a remaining distance to a next guide point; an image processor that performs image processing on a specified region, in the captured image, corresponding to a position distanced by the remaining distance; and an output unit that outputs the captured image processed by the image processor, wherein the image processor controls an edge strength of a subject in the specified region, in accordance with the remaining distance.

19 Claims, 13 Drawing Sheets

(51) Int. Cl.
  *G06K 9/00* (2006.01)
  *G01C 21/36* (2006.01)
  *G06T 11/60* (2006.01)
  *G06T 11/00* (2006.01)
(52) U.S. Cl.
  CPC .......... *G06K 9/00798* (2013.01); *G06T 7/536* (2017.01); *G06T 11/00* (2013.01); *G06T 11/60* (2013.01); *G06T 2207/20192* (2013.01); *G06T 2207/30256* (2013.01)
(58) Field of Classification Search
  CPC ...... G06T 2207/30256; G06K 9/00798; G01C 21/3676; G01C 21/3602; G01C 21/3655; G01C 21/3647
  See application file for complete search history.

(56) References Cited

U.S. PATENT DOCUMENTS

| | | | | |
|---|---|---|---|---|
| 2010/0153000 A1* | 6/2010 | Akita | ................ | G01C 21/3632 701/429 |
| 2012/0221207 A1 | 8/2012 | Nakamura | | |
| 2013/0101175 A1* | 4/2013 | Lynch | ................ | G01C 21/3638 382/106 |
| 2013/0173154 A1* | 7/2013 | Wither | ................ | G01C 21/3673 701/532 |
| 2013/0321628 A1* | 12/2013 | Eng | ................ | B60R 1/00 348/148 |
| 2015/0222813 A1* | 8/2015 | Okude | ................ | G01C 21/3602 701/523 |
| 2017/0087023 A1* | 3/2017 | Peli | ................ | A61H 3/061 |
| 2017/0285916 A1* | 10/2017 | Xu | ................ | G06T 11/60 |
| 2018/0286094 A1* | 10/2018 | Shishido | ................ | G06T 11/60 |
| 2019/0161010 A1* | 5/2019 | Repale | ................ | B60R 1/00 |

FOREIGN PATENT DOCUMENTS

| | | |
|---|---|---|
| JP | 2007-292713 | 11/2007 |
| JP | 2009-186372 | 8/2009 |
| JP | 5634046 | 10/2014 |

* cited by examiner

IMAGE PROCESSING DEVICE, DISPLAY DEVICE, NAVIGATION SYSTEM, AND IMAGE PROCESSING METHOD

CROSS REFERENCE TO RELATED APPLICATION

The present application is based on and claims priority of Japanese Patent Application No. 2017-254585 filed on Dec. 28, 2017.

FIELD

The present disclosure relates to an image processing device, a display device, a navigation system, an image processing method, and a program.

BACKGROUND

Studies have been conducted on the technology to display, on an image captured by a camera mounted on a vehicle, information for guiding the vehicle in a vehicle navigation system. For example, patent literature (PTL) 1 displays an image obtained by superimposing an image showing the current position of a mobile object and guide information indicating the traveling direction of such mobile object onto an image captured by the mobile object.

CITATION LIST

Patent Literature

Japanese Unexamined Patent Application Publication No. 10-132598

SUMMARY

However, the technology according to PTL 1 can be improved upon.

In view of this, the present disclosure provides an image processing device, a display device, a navigation system, an image processing method, and a program capable of improving upon the above related art by facilitating the visual recognition of a guide point at which a vehicle is guided in accordance with guide information, etc. on a captured image.

The image processing device according to one aspect of the present disclosure includes: a first obtainer that obtains a captured image from an imaging device that captures a view in front of a vehicle; a second obtainer that obtains a remaining distance to a next guide point; an image processor that performs image processing on a specified region, in the captured image, corresponding to a position distanced by the remaining distance; and an output unit that outputs the captured image processed by the image processor. In such image processing device, the image processor controls an edge strength of a subject in the specified region, in accordance with the remaining distance.

The image processing method according to another aspect of the present disclosure includes: (i) obtaining a captured image from an imaging device that captures a view in front of a vehicle; (ii) obtaining a remaining distance to a next guide point; (iii) performing image processing on a specified region, in the captured image, corresponding to a position distanced by the remaining distance; and (iv) outputting the captured image on which the image processing has been performed in (iii). In such image processing method, in (iii), an edge strength of a subject in the specified region is controlled in accordance with the remaining distance, and at least one of (i) through (iv) is executed by a control circuit.

Note that these comprehensive or specific aspects may be implemented as a system, a device, a method, an integrated circuit, a computer program, or a computer-readable recording medium such as a recording disk, or may be implemented as any combination of a system, a device a method, an integrated circuit, a computer program, and a recording medium. Examples of the computer-readable recording medium include a non-volatile recording medium such as a compact disc-read only memory (CD-ROM).

An image processing device, etc. according to one aspect of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
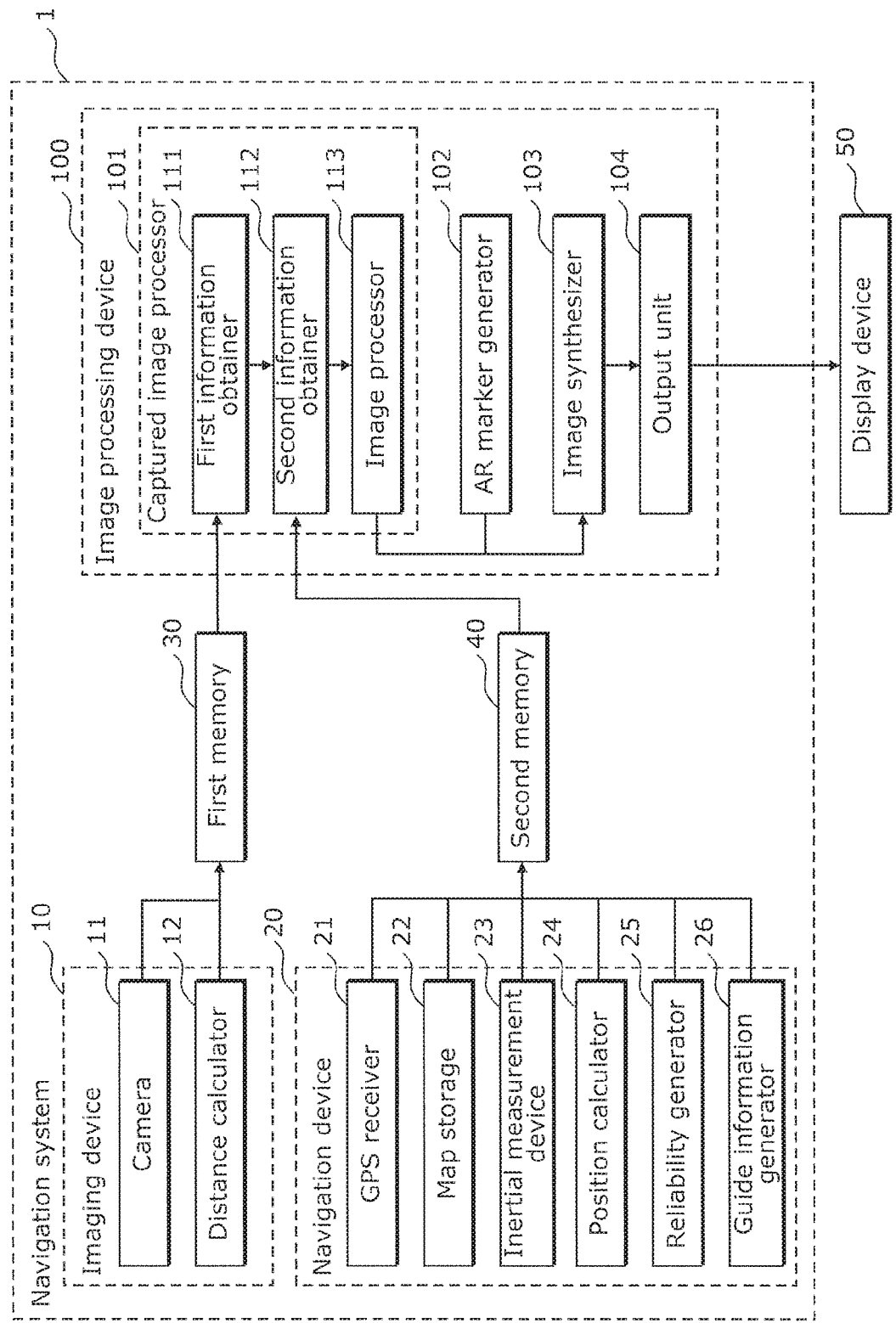
FIG. 1 is a block diagram of exemplary functional components of a navigation system that includes an image processing device according to Embodiment 1.

The inventors have studied the technology that utilizes an image captured by a vehicle-mounted camera for an image that lets the driver know the surrounding conditions of the vehicle, such as an image displayed on a vehicle navigation system. One such technology is augmented reality (AR) as disclosed, for example, in PTL 1 in which a marker for guiding a vehicle, such as one indicating a traveling direction and a left/right-turn direction, is superimposed and displayed on a captured image. However, when the captured image includes a plurality of intersections, for example, the driver needs to take time to recognize an intersection indicated by the marker. Furthermore, the driver needs to take a longer time to recognize such intersection as the distance is greater from the camera to the intersection indicated by the marker. Unable to gaze at the image, the driver needs to visually recognize a target indicated by the marker easily and reliably. In view of the above, the inventors have conceived the technology described below that enables easy and reliable visual recognition of a target on an image.

For example, the image processing device according to one aspect of the present disclosure includes: a first obtainer that obtains a captured image from an imaging device that captures a view in front of a vehicle; a second obtainer that obtains a remaining distance to a next guide point; an image processor that performs image processing on a specified region, in the captured image, corresponding to a position distanced by the remaining distance; and an output unit that outputs the captured image processed by the image processor. In such image processing device, the image processor controls an edge strength of a subject in the specified region, in accordance with the remaining distance.

The image processor according to the above aspect controls the edge strength of a subject in a specified region, included in a captured image, corresponding to the position distanced from the vehicle by the remaining distance, in accordance with the remaining distance to the next guide point. Even when the visual recognition of the position of the next guide point on a captured image is not easy due to, for example, a reason that the next guide point is remote, that an obstacle is present on the route to the next guide point, etc., the image processor controls the edge strength of a subject in the specified region to enable the user to readily recognize the position of such next guide point. The image processing device is thus capable of facilitating the visual recognition of a guide point on a captured image.

The image processing device according to one aspect of the present disclosure may further include: a third obtainer that obtains distance information on a distance to each of positions in the captured image, wherein the image processor may determine the specified region in accordance with the remaining distance, based on the distance information on the distance to each of the positions in the captured image.

The above aspect, in which the specified region is determined on the basis of the information on the distance to each of the positions in the captured image, improves the accuracy of the position of the specified region that is determined in accordance with the remaining distance. This improves the accuracy of controlling the edge strength of a subject in the specified region that is in accordance with the remaining distance.

The image processing device according to one aspect of the present disclosure may further include: an estimator that estimates, from the captured image, distance information on a distance to each of positions in the captured image, wherein the image processor may determine the specified region in accordance with the remaining distance, based on the distance information on the distance to each of the positions in the captured image.

The image processing device according to the above aspect includes the estimator that estimates, from the captured image, information on the distance to each of the positions in the captured image, and thus the imaging device is not required to include such estimator. This structure enables the image processing device to be applied to a variety of imaging devices, and expands the versatility of the image processing device.

The image processing device according to one aspect of the present disclosure may further include: an estimator that estimates, from the captured image, a vanishing point in the captured image, wherein the image processor may determine the specified region in accordance with the remaining distance, based on a relationship between each of positions in the captured image and the vanishing point.

The image processing device according to the above aspect uses the vanishing point estimated from the captured image to determine the specified region. The calculation of the distance to each of the positions in the captured image is possible from the relationship between the vanishing point and each of the positions. The estimation of a vanishing point is possible from a single captured image. This structure enables the image processing device to be applied to a monocular camera, and expands the versatility of the image processing device.

In the image processing device according to one aspect of the present disclosure, the image processor may control the edge strength of the subject in the specified region by performing the image processing at a higher intensity level as a difference is smaller between the remaining distance and a distance to a pixel to be processed that represents the subject.

The image processing device according to the above aspect controls the edge strength of the specified region in the captured image by performing image processing at a higher intensity level, as a region is closer to the position distanced by the remaining distance. This enables the user to readily recognize a region close to the position distanced by the remaining distance.

In the image processing device according to one aspect of the present disclosure, the image processor may control the edge strength of the subject in the specified region by performing the image processing at a higher intensity level as a difference is greater between the remaining distance and a distance to a pixel to be processed that represents the subject.

The image processing device according to the above aspect controls the edge strength of the specified region in the captured image by performing image processing at a lower intensity level, as a region is closer to the position distanced by the remaining distance. This enables the user to identify a region close to the position distanced by the remaining distance, which is made possible by the image processing performed on a surrounding region of the position distanced by the remaining distance, and to visually recognize the image of the position distanced by the remaining distance in a state that is substantially close to the real image.

In the image processing device according to one aspect of the present disclosure, the image processor may control the edge strength of the subject in the specified region by performing the image processing at an intensity level of zero when a difference between the remaining distance and a distance to a pixel to be processed that represents the subject is smaller than a first threshold, and by performing the image processing at an intensity level greater than zero when the difference is greater than or equal to the first threshold.

The image processing device according to the above aspect does not perform image processing on a region close to the position distanced by the remaining distance in the specified region in the captured image. This enables the user to identify a region close to the position distanced by the remaining distance, which is made possible by the image processing performed on a surrounding region of the position distanced by the remaining distance, and to visually recognize the image of the position distanced by the remaining distance in a state that is substantially close to the real image.

In the image processing device according to one aspect of the present disclosure, the image processor may control the edge strength of the subject in the specified region by performing the image processing at an intensity level of zero when a difference between the remaining distance and a distance to a pixel to be processed that represents the subject is smaller than a second threshold, and by performing the image processing at an intensity level greater than zero when the difference falls between the second threshold and a third threshold, inclusive.

The image processing device according to the above aspect does not perform image processing on regions close to and remote from the position distanced by the remaining distance in the specified region in the captured image. This enables the user to identify a region close to the position distanced by the remaining distance, which is made possible by the image processing performed on a restricted region around the position distanced by the remaining distance, and to visually recognize the image of the position distanced by the remaining distance in a state that is substantially close to the real image.

In the image processing device according to one aspect of the present disclosure, the image processor may control the edge strength of the subject in the specified region by performing the image processing, the image processing being at least one, or a combination of lightness change, color saturation change, edge enhancement, blurring, flashing, and flickering.

The above aspect facilitates the user's visual recognition of the specified region in the captured image.

In the image processing device according to one aspect of the present disclosure, the second obtainer may obtain a guide direction in which the vehicle is to be guided at the next guide point, and the image processor may control the edge strength of the subject in the specified region by performing the image processing at an intensity level that is changed in accordance with the guide direction.

The above aspect enables the user to visually recognize a region, in the captured image, on which image processing has been performed, and thus to recognize the guide direction at the guide point.

The image processing device according to one aspect of the present disclosure may further include: a road estimator that estimates a road region that is a region including a road in the captured image, wherein the image processor may control the edge strength of the subject in the specified region in accordance with positions of left and right directions in the road region estimated by the road estimator.

The above aspect enables the user to visually recognize a region, in the captured image, on which image processing has been performed, and thus to readily recognize the position on a road on which the vehicle is traveling.

The image processing device according to one aspect of the present disclosure may further include: a fourth obtainer that obtains information on reliability of a position of the vehicle detected by a navigation system of the vehicle equipped with the imaging device, wherein the image processor may change a value of the first threshold in accordance with the information obtained by the fourth obtainer.

The above aspect mitigates the effect caused by an error of the vehicle position detected by the navigation system on the position of a region, in the captured image, on which image processing is to be performed. This enables image processing to be performed on a correct position.

The image processing device according to one aspect of the present disclosure may further include: a fifth obtainer that obtains map information on the next guide point, wherein the image processor may change a value of the first threshold in accordance with the map information obtained by the fifth obtainer.

The image processing device according to the above aspect is capable of performing image processing that is in accordance with a state of the guide point on the map. For example, the image processing device is capable of controlling a region on which image processing is to be performed and the intensity of image processing in accordance with information on a road, such as the size of the road or an intersection, etc. at a guide point, the number of lanes of the road, Functional Road Class, etc. This enables the image processing device to perform image processing that facilitates the user's visual recognition, in accordance with a state of the guide point on the map.

The image processing device according to one aspect of the present disclosure may further include: a marker generator that obtains guide information corresponding to the next guide point, and generates an augmented reality marker that is an image indicating the guide information; and an image synthesizer that synthesizes the captured image processed by the image processor with the augmented reality marker to superimpose and display the augmented reality marker on the captured image.

The image processing device according to the above aspect is capable not only of controlling the edge strength of the subject in the specified region in the captured image, but also of facilitating the user's visual recognition of the guide point by superimposing and displaying the AR marker on the captured image.

Also, the display device according to another aspect of the present disclosure includes the image processing device according to one aspect of the present disclosure, the display device displaying: information outputted from a navigation system of the vehicle equipped with the imaging device; and the captured image processed by the image processor. The above aspect provides the same effect as achieved by the image processing device according to one aspect of the present disclosure.

Also, the navigation system according to another aspect of the present disclosure includes the image processing device according to one aspect of the present disclosure, the navigation system outputting, to a display device, information for guiding the vehicle equipped with the imaging device, and the captured image processed by the image processor, and causing the display device to display the information and the captured image. The above aspect provides the same effect as achieved by the image processing device according to one aspect of the present disclosure.

Also, the image processing method according to another aspect of the present disclosure includes: (i) obtaining a captured image from an imaging device that captures a view in front of a vehicle; (ii) obtaining a remaining distance to a next guide point; (iii) performing image processing on a specified region, in the captured image, corresponding to a position distanced by the remaining distance; and (iv) outputting the captured image on which the image processing has been performed in (iii); wherein in (iii), an edge strength of a subject in the specified region is controlled in accordance with the remaining distance, and at least one of (i) through (iv) is executed by a control circuit. The above aspect provides the same effect as achieved by the image processing device according to one aspect of the present disclosure.

Also, the program according to another aspect of the present disclosure causes a computer to execute: (i) obtaining a captured image from an imaging device that captures a view in front of a vehicle; (ii) obtaining a remaining distance to a next guide point; (iii) performing image processing on a specified region, in the captured image, corresponding to a position distanced by the remaining distance; and (iv) outputting the captured image on which the image processing has been performed in (iii); wherein in (iii), an edge strength of a subject in the specified region is controlled in accordance with the remaining distance. The above aspect provides the same effect as achieved by the image processing device according to one aspect of the present disclosure.

Note that these comprehensive or specific aspects may be implemented as a system, a device, a method, an integrated circuit, a computer program, or a computer-readable recording medium such as a recording disk, or may be implemented as any combination of a system, a device a method, an integrated circuit, a computer program, and a recording medium. Examples of the computer-readable recording medium include a non-volatile recording medium such as a CD-ROM. Also, the device may be constituted by one or more devices. When the device is constituted by two or more devices, such two or more devices may be disposed in a single appliance or may be disposed individually in separated two or more appliances. A "device" recited in the present description and claims can mean not only a single device, but also a system that includes a plurality of devices.

The following specifically describes an image processing device according to the present disclosure with reference to the drawings. Note that the following embodiments show a comprehensive or specific illustration of the present disclosure. The numerical values, shapes, structural components, the arrangement and connection of the structural components, steps (processes), the processing order of the steps, etc. shown in the following embodiments are mere examples, and thus are not intended to limit the present disclosure. Of the structural components described in the following embodiments, structural components not recited in any one of the independent claims that indicate the broadest concepts of the present disclosure will be described as optional structural components. Note that the drawings are schematic diagrams, and thus they are not necessarily precise illustrations. Also note that the substantially same structural components are assigned the same reference marks throughout the drawings, and descriptions of components that are substantially the same as those previously described may be omitted.

Embodiment 1

Image processing device 100 according to Embodiment 1 will be described. The present embodiment describes image processing device 100 that generates an image obtained by superimposing information obtained from a navigation device of a vehicle onto a captured image obtained by a camera mounted on such vehicle. Image processing device 100 according to the present embodiment is on the same vehicle on which the camera and the navigation device are mounted to constitute a navigation system together with the camera and the navigation device. Note that image processing device 100 processes not only an image captured by a vehicle-mounted camera and information obtained by a navigation device, and thus may process anything as long as it is an image captured by a camera and information that is superimposed and displayed on such image.

Image processing device 100 and its peripheral components according to Embodiment 1 will be described. FIG. 1 is a block diagram of exemplary functional components of navigation system 1 that includes image processing device 100 according to Embodiment 1. Navigation system 1 includes imaging device 10, navigation device 20, first memory 30, second memory 40, and image processing device 100. Image processing device 100 includes captured image processor 101, AR marker generator 102, image synthesizer 103, and output unit 104.

Navigation system 1 causes display device 50 to display images and sounds that include information, etc. for guiding the travel of the vehicle equipped with navigation system 1. Of a display and a speaker, display device 50 includes at least the display. Examples of the display include a liquid crystal display (LCD) and an organic/inorganic electroluminescence (EL) display.

Imaging device 10 is on the same vehicle that is equipped with navigation device 20. Imaging device 10 includes camera 11 and distance calculator 12. Camera 11 captures an image of a view in front of the vehicle, and outputs the captured image to first memory 30. Camera 11 captures one of or both of a still image and a moving image. Camera 11 generates a digital image as a captured image. Examples of camera 11 include a monocular camera having one lens and a compound eye camera having two or more lenses. A compound eye camera generates a stereo image.

Distance calculator 12 calculates the distance between camera 11 and each of the positions in a captured image obtained by camera 11, and outputs the calculated distances to first memory 30. Distance calculator 12 may calculate, for example, the distance between camera 11 and each of the pixels that represent a subject in a captured image, and generate a range image that includes the calculated distances as the pixel values of the pixels. The arrangement of the pixels in the range image is the same as that of the captured image. When camera 11 is a monocular camera, distance calculator 12 estimates, for example, the position of a vanishing point, which is an ideal point within the captured image, and calculates the distance between camera 11 and each of the pixels that represent a subject, on the basis of the distance between the vanishing point and each of the pixels and the angle of view of the camera. When camera 11 is a compound eye camera, distance calculator 12 calculates the distance between camera 11 and each of the pixels that represent the subject, by applying, for example, the stereo algorithm that utilizes the triangulation technique to two captured images being stereo images.

Navigation device 20 is on the same vehicle equipped with image processing device 100. Navigation device 20 outputs guide information that shows the route to a destination, on the basis of the destination having been inputted. Navigation device 20 includes global positioning system (GPS) receiver 21, map storage 22, inertial measurement device 23, position calculator 24, reliability generator 25, and guide information generator 26.

GPS receiver 21 detects the position of the vehicle on the basis of signals from satellites, and outputs the detected position to reliability generator 25 and guide information generator 26. GPS receiver 21 can include, for example, by a communication circuit. Map storage 22 stores map information. Inertial measurement device 23 includes an acceleration sensor and an angular acceleration sensor (also known as a "gyroscope sensor"). Inertial measurement device 23 detects an acceleration and an angular acceleration of the vehicle, and outputs the detected acceleration and angular acceleration to position calculator 24. Position calculator 24 calculates the direction and speed of traveling of the vehicle, on the basis of the acceleration and angular acceleration obtained from inertial measurement device 23, and calculates the position of the vehicle on the basis of the calculated direction and speed of traveling of the vehicle. Position calculator 24 outputs the calculated vehicle position to reliability generator 25 and guide information generator 26.

Reliability generator 25 compares the vehicle position obtained from GPS receiver 21 with the vehicle position obtained from position calculator 24. Subsequently, in the present embodiment, reliability generator 25 determines the accuracy of the vehicle position detected by GPS receiver 21 as the reliability of the vehicle position. When the detection accuracy is high, the reliability of the vehicle position is high, and when the detection accuracy is low, the reliability of the vehicle position is low. Note that reliability generator 25 may determine, as the reliability of the vehicle position, the accuracy of the vehicle position detected by any one of GPS receiver 21 and position calculator 24. Reliability generator 25 outputs, to guide information generator 26, the detection accuracy and the vehicle position in association with each other.

Guide information generator 26 determines a route to the destination, on the basis of the destination inputted by the user via a non-illustrated interface, the vehicle position obtained from GPS receiver 21 and/or position calculator 24, and the map information stored in map storage 22. Guide information generator 26 further generates guide information on the traveling route in accordance with the traveling of the vehicle on the basis of the determined route, and outputs the generated guide information to second memory 40. The guide information includes: the traveling direction that includes straight-ahead, left/right turn, etc.; the position of the next guide point such as the position of the next left/right turn; and the distance from the current vehicle position to the next guide point. The next guide point is a point having a three-dimensional distance from the vehicle equipped with image processing device 100.

Guide information generator 26 may select and use any of the vehicle positions obtained from GPS receiver 21 and/or position calculator 24, and thus may select and use the vehicle position obtained from GPS receiver 21 or position calculator 24 on the basis of the reliability of the vehicle position obtained from reliability generator 25. For example, in generating guide information, guide information generator 26 may use the vehicle position obtained from GPS receiver 21 when the reliability is high, and may use the vehicle position obtained from position calculator 24 when the reliability is low. Guide information generator 26 may output to second memory 40 the guide information and the reliability of the vehicle position used to generate the guide information in association with each other. Guide information generator 26 also outputs to second memory 40 map information on the surroundings of the determined route.

First memory 30 and second memory 40 enable the storage and reading out of a variety of information. First memory 30, second memory 40, and map storage 22 of navigation system 20 are implemented, for example, as a read-only memory (ROM), a random access memory (RAM), a semiconductor memory such as a flash memory, a hard disk drive, or a storage device such as a solid state drive (SSD). Although disposed separately from imaging device 10, navigation device 20, and image processing device 100 in an example illustrated in FIG. 1, first memory 30 and second memory 40 may be included in any of these devices. For example, first memory 30 may be included in imaging device 10 or image processing device 100, and second memory 40 may be included in navigation device 20 or image processing device 100. Such first memory 30 and second memory 40 may store programs that operate the structural components of imaging device 10, navigation device 20, and image processing device 100. These programs may be stored in a non-illustrated memory included in imaging device 10, navigation device 20, and image processing device 100. Also, first memory 30 and second memory 40 may be implemented in an integrated form.

Image processing device 100 generates a synthesized image obtained by superimposing and displaying the guide information on the captured image, and outputs the generated image to display device 50. Image processing device 100 may be equipped in a single device or appliance, or may be equipped in a plurality of devices or appliances in a divided manner. For example, one or more, or all parts of image processing device 100 may be incorporated into imaging device 10 and/or navigation device 20.

Captured image processor 101 performs, on a specified region and/or its surroundings in a captured image, image processing that controls the edge strength of a subject in the specified region, on the basis of the guide information. Stated differently, captured image processor 101 performs image processing on the specified region directly or indirectly. AR marker generator 102 generates an image that corresponds to the guide information and that is to be superimposed and displayed on the captured image. Image synthesizer 103 synthesizes the captured image processed by captured image processor 101 with the image generated by AR marker generator 102 to superimpose and display the image generated by AR marker generator 102 on the captured image. Output unit 104 outputs the synthesized image obtained by image synthesizer 103 to display device 50 to cause it to display the image. Here, AR marker generator 102 is an example of the marker generator.

Captured image processor 101 includes first information obtainer 111, second information obtainer 112, and image processor 13. First information obtainer 111 obtains from first memory 30 information on the captured image, and outputs the information to image processor 113. More specifically, first information obtainer 111 obtains the captured image from first memory 30. First information obtainer 111 further obtains from first memory 30 distance information, e.g., the range image, on the distance to each of the positions in the captured image in association with the captured image. Second information obtainer 112 obtains from second memory 40 information on navigation device 20, and outputs the information to image processor 113. More specifically, second information obtainer 112 obtains the guide information from second memory 40. Second information obtainer 112 further obtains the reliability of the vehicle position. Also, second information obtainer 112 further obtains the map of the surroundings of the route. Here, first information obtainer 111 is an example of the first obtainer and the third obtainer, and second information obtainer 112 is an example of the second obtainer, the fourth obtainer, and the fifth obtainer.

Image processor 113 extracts, from within the guide information, the remaining distance from the vehicle to the next guide point on the route, and identifies, in the range image, a specified region corresponding to the position distanced from the vehicle by the remaining distance. In so doing, image processor 113 may identify, as the specified region, pixels from the range image that amount to the same distance as the remaining distance, or may identify, as the specified region, pixels from the range image that amount to the distance in the vicinity of the remaining distance. Alternatively, image processor 113 may identify, as the specified region, pixels from the range image that amount to a distance at or beyond the position distanced by the remaining distance. For example, when the next guide point is an intersection, an example of the distance in the vicinity is a distance obtained by adding, to the remaining distance, the width of a road that crosses with respect to the traveling direction of the vehicle.

Image processor 113 further performs image processing on the captured image in accordance with the remaining distance to control the edge strength of a subject in the specified region, and outputs the processed image to image synthesizer 103. Image processor 113 performs image processing on at least part of the specified region and/or its surroundings. For example, image processor 113 may: extract an edge of the subject in the specified region to perform image processing on the extracted edge; perform image processing on the entirety of the specified region; or perform image processing on the surroundings of the specified region. An example of the image processing to control the edge strength of the subject in the specified region is at least one, or a combination of lightness change, color saturation change, edge enhancement, blurring, flashing, and blinking. The control of the edge strength of the subject in the specified region enables the control of the user's visual recognition of the specified region.

Figure 2:
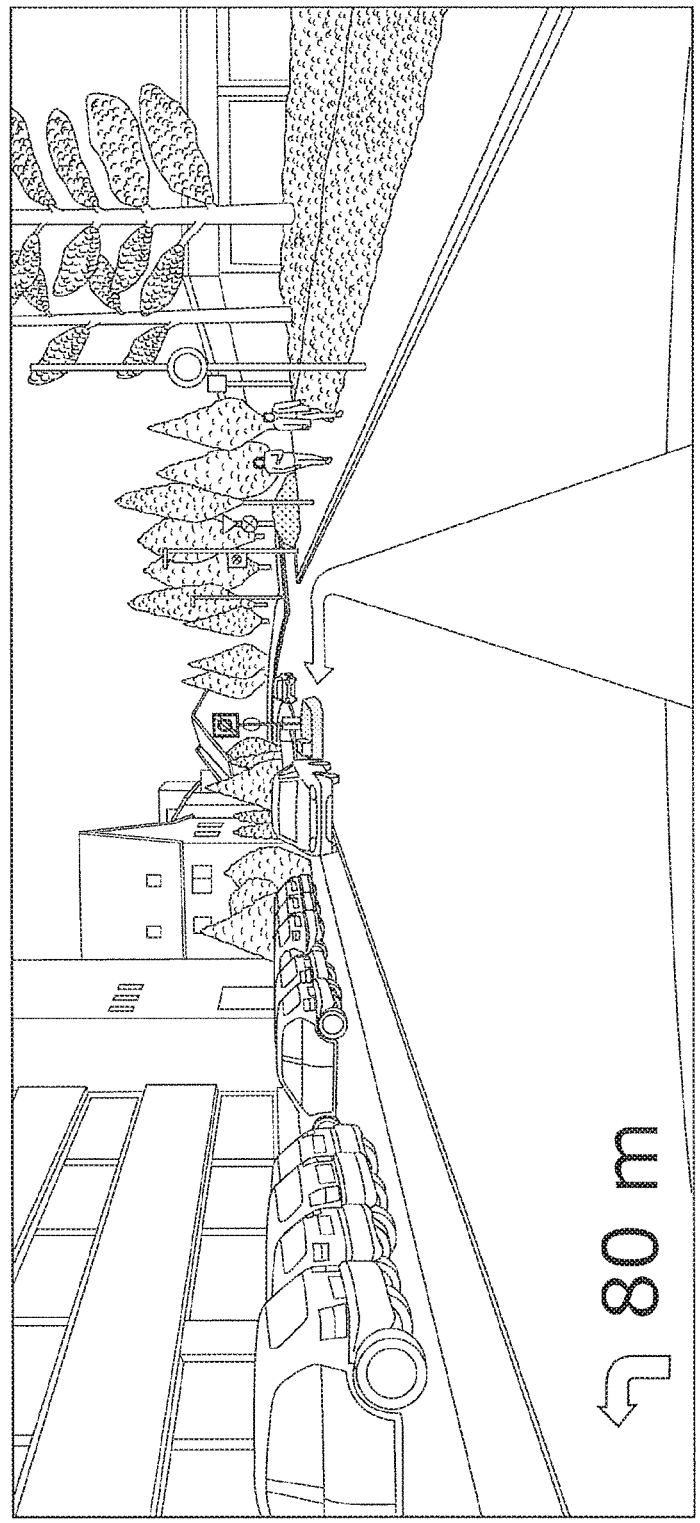
FIG. 2 is a schematic diagram showing an exemplary image captured at a point in time when the remaining distance from a vehicle to an intersection, being the next guide point, is 80 meters.
Figure 3:
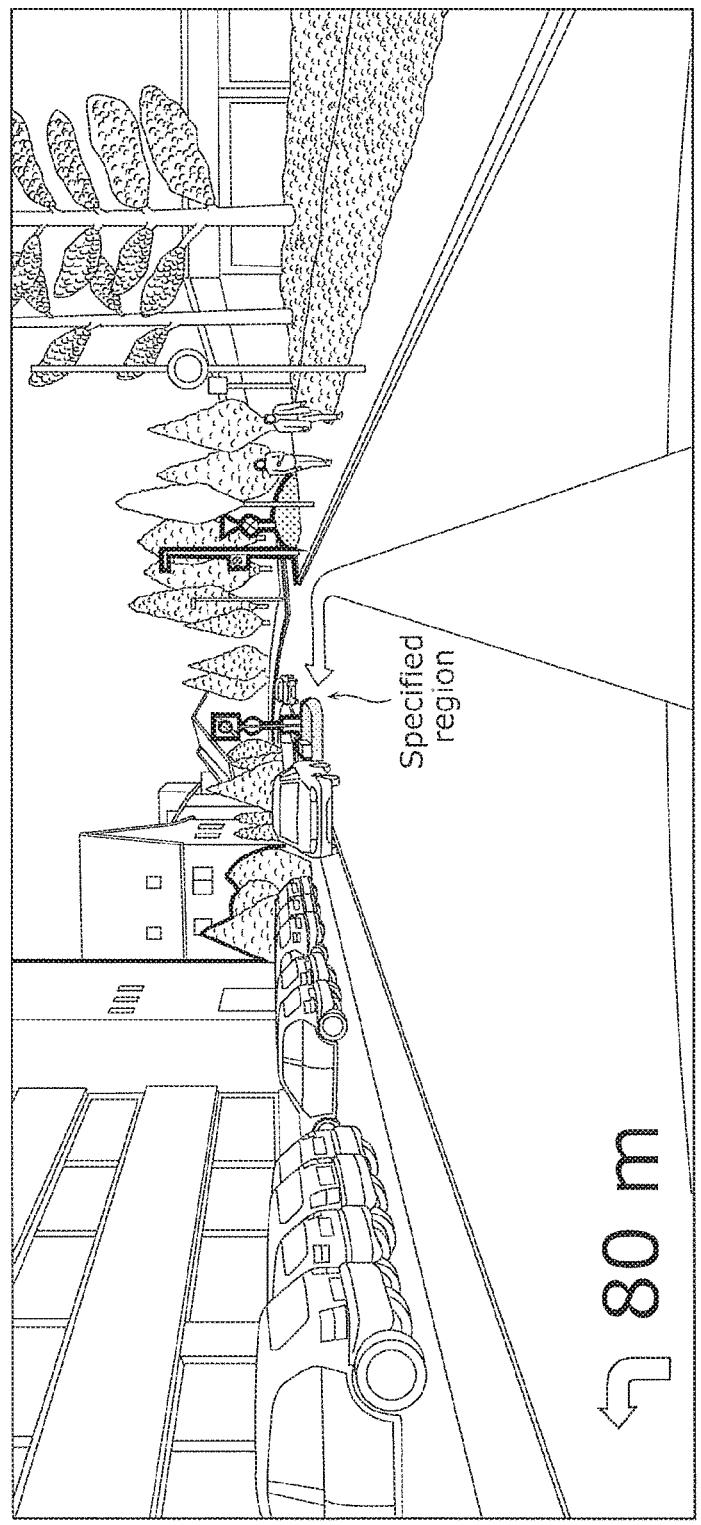
FIG. 3 is a schematic diagram showing an exemplary processed image obtained by performing edge enhancement on the captured image of FIG. 2.
Figure 4:
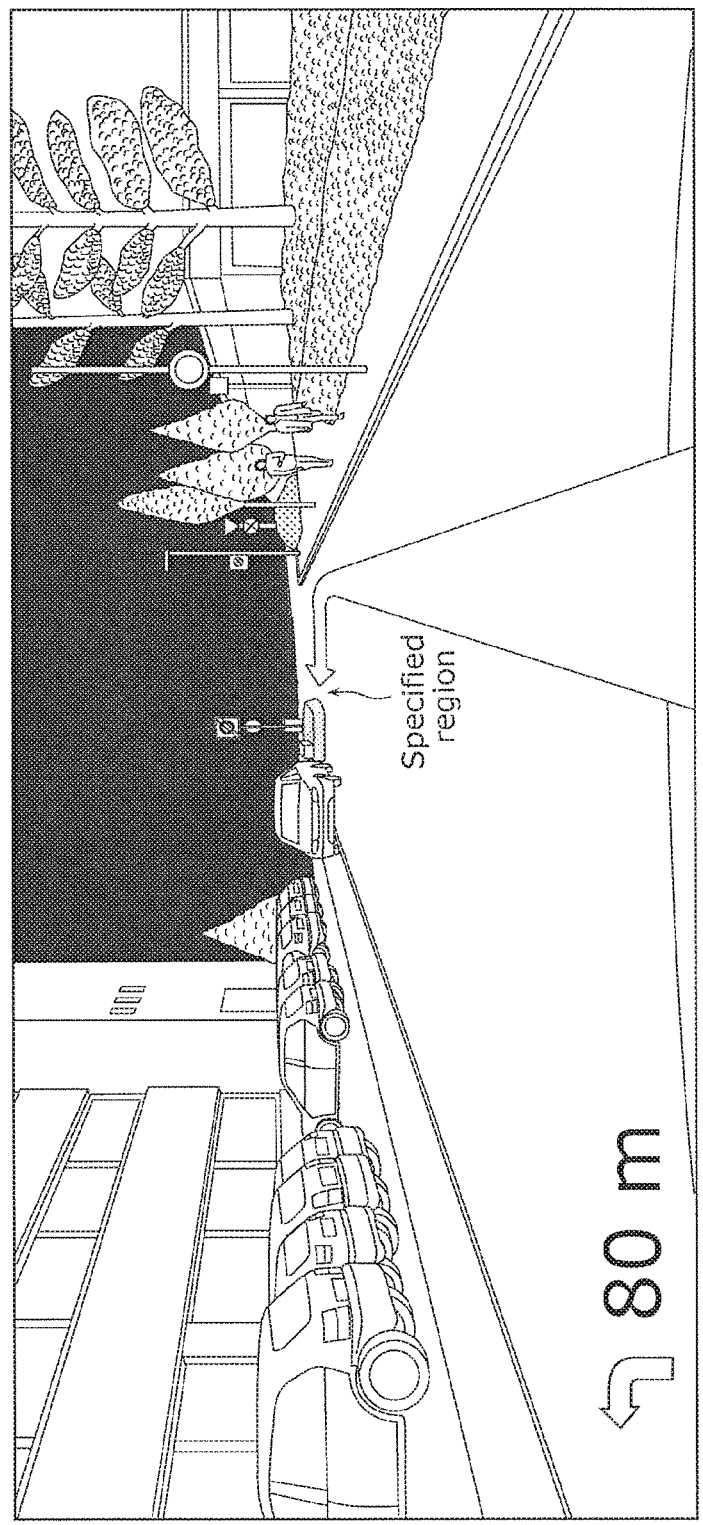
FIG. 4 is a schematic diagram showing an exemplary processed image obtained by changing the lightness of the captured image of FIG. 2.
Figure 5:
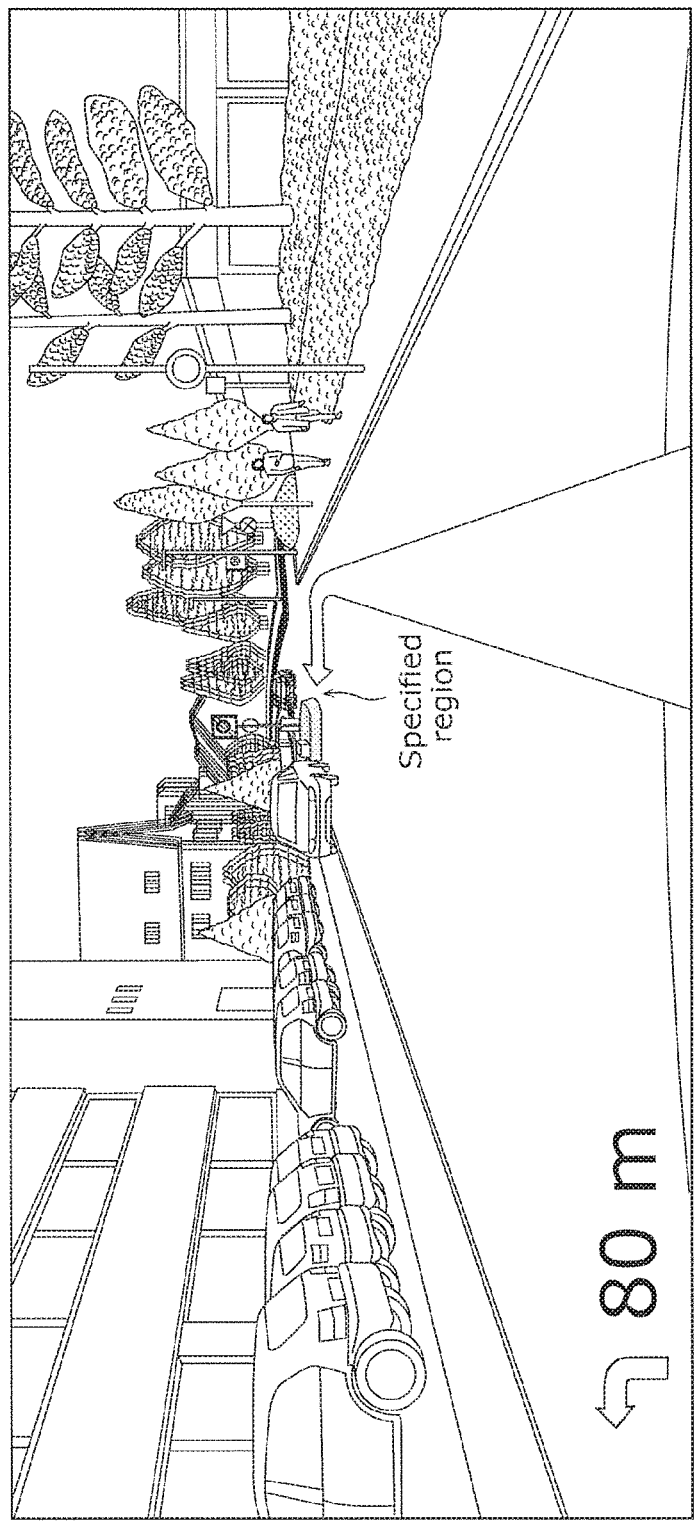
FIG. 5 is a schematic diagram showing an exemplary processed image obtained by blurring the captured image of FIG. 2.

For example, FIG. 3, FIG. 4, and FIG. 5 show exemplary processed images obtained by image processor 113 performing image processing on the captured image shown in FIG. 2. FIG. 2 shows an exemplary image captured at a point in time when the remaining distance from the vehicle to an intersection, being the next guide point, is 80 meters. An image of an arrow serving as a marker indicating the traveling direction is superimposed and displayed on the captured image shown in FIG. 2. FIG. 2 to FIG. 5 are all exemplary images captured in an environment in which vehicle runs on the right side of the road.

FIG. 3 shows an exemplary processed image obtained by performing edge enhancement on the captured image of FIG. 2. In this image processing, a pixel region that represents an image located within a distance range of 75 meters to 80 meters from the vehicle, i.e., camera 11, is determined as a specified region. An edge of the subject included in such specified region is thickened to be enhanced. This image processing enhances the edge of the subject in the specified region. The edge of the subject in an example of FIG. 3 is black, but its color saturation may be changed to a visible color such as red, by changing the luminance, or the pixel values of the respective pixels of the edge. The edge of the subject may be subjected to at least one of lightness change, flashing, and flickering. Note that the edge of the subject may be subjected to at least one of lightness change, color saturation change, flashing, and flickering, without being thickened.

FIG. 4 shows an exemplary processed image obtained by changing the lightness of the captured image of FIG. 2. In this image processing, a pixel region that represents an image located within a distance range of 75 meters to 85 meters from the vehicle is determined as a specified region. The color of the entirety of a pixel region that represents an image located at or beyond the specified region, i.e., at or beyond 85 meters distanced from the vehicle, is changed to a monotonous, darker color by decreasing the luminance of the pixels. This image processing enhances the edge of the subject in the specified region, or more specifically, the peripheral edge of the specified region is enhanced. The pixel region subjected to the image processing is black in an example of FIG. 4, but it may be brightened up to a whitish color, or its color saturation may be changed to a visible color such as red. The pixel region subjected to the image processing may be subjected to processing such as flashing or flickering.

FIG. 5 shows an exemplary processed image obtained by blurring the captured image of FIG. 2. In this image processing, a specified region is determined as in the case of FIG. 4, and the entirety of the pixel region that represents an image located at or beyond the specified region, i.e., at or beyond 85 meters distanced from the vehicle, is blurred. This image processing enhances the edge of the subject in the specified region, or more specifically, the peripheral edge of the specified region is enhanced. The pixel region subjected to the image processing may be subjected to at least one of lightness change, color saturation change, flashing, and flickering, in addition to blurring.

Figure 6:
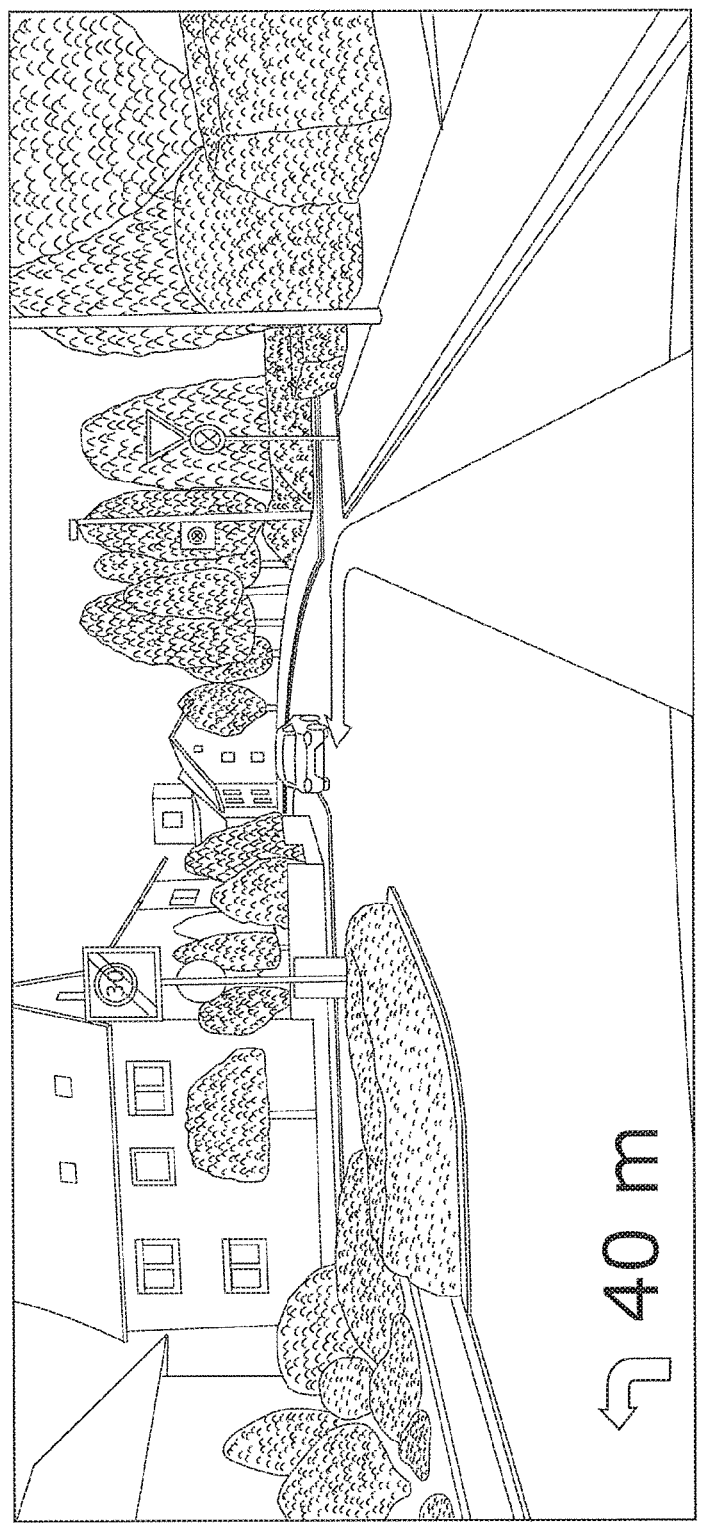
FIG. 6 is a schematic diagram showing an exemplary image captured at a point in time when the remaining distance from the vehicle to an intersection, being the next guide point, is 40 meters.

For example, FIG. 6 shows an exemplary image captured at a point in time when the remaining distance to an intersection, being the next guide point, is 40 meters. As shown in FIG. 2 and FIG. 6, in a simple captured image, while the user can visually recognize the position of and the traveling route to the next guide point with ease when the remaining distance is 40 meters, the user has difficulty in visually recognizing the position of and the traveling route to the next guide point when the remaining distance is 80 meters. Meanwhile, the user can readily and instantly recognize the next guide point in any of the images of FIG. 3, FIG. 4, and FIG. 5.

Note that image processor 113 may change the intensity of image processing, i.e., the level of image processing, in accordance with the remaining distance. For example, image processor 113 may set the intensity of image processing to be performed on each of the pixels in the specified region and/or its surroundings to a higher level, as the difference is smaller between the remaining distance and the distance from the vehicle, i.e., camera 11, to a subject represented by each of such pixels, i.e., as the position of the subject represented by such pixels is closer to the position distanced by the remaining distance. Image processor 113 may set the intensity of image processing to a higher level, as the difference is greater between the remaining distance and the distance to the subject represented by such pixels, i.e., as the position of the subject represented by such pixels is more remote from the position distanced by the remaining distance. For example, to set the intensity of image processing to a higher level, the weight of the edge is increased in an example of FIG. 3, the surroundings of the specified region are more darkened in an example of FIG. 4, and the degree of blurring is increased in an example of FIG. 5. This enables the user to readily recognize the position of the next guide point on a processed image. Note that the difference between the remaining distance and the distance to the subject represented by the pixels is the absolute value of the difference between the remaining distance and the distance to the subject represented by the pixels.

Alternatively, image processor 113 may change the intensity of image processing to be performed on each of the pixels in the specified region and/or its surroundings, on the basis of a threshold related to the difference between the remaining distance and the distance from each of such pixels to the subject. For example, image processor 113 may set the intensity of image processing to zero, i.e., image processor 113 may not perform image processing on each of the pixels in the specified region and/or its surroundings, when the difference between the remaining distance and the distance to the subject represented by such pixels is smaller than a first threshold. Image processor 113 may set the intensity of image processing to greater than zero, i.e., image processor 113 may perform image processing, when such difference is greater than or equal to the first threshold. This enables the user to visually recognize the subject located at the position of the next guide point on the processed image. Also, the image processing performed on the surroundings of such guide point further enables the user to readily recognize the position of the guide point.

When the above-described difference is greater than or equal to the first threshold, image processor 113 may control the intensity of image processing in accordance with an intensity function, as represented by Equation 1 below, that uses natural logarithm. In Equation 1, F denotes the intensity of image processing, D1 denotes the distance from the vehicle to the subject represented by the pixels in the specified region and/or its surroundings, D2 denotes the remaining distance, T1 denotes the first threshold, and a denotes a coefficient. Equation 1 is used when the difference (D1−D2) is greater than or equal to the first threshold. The control of the intensity of image processing in accordance with Equation 1 can correspond to the control to set the intensity of image processing to a higher level as the difference (D1−D2) is greater, i.e., as the position of the subject is more remote from the position distanced by the remaining distance. Image processing that is based on Equation 1 may be applied to the examples of FIG. 4 and FIG. 5. Note that when the difference (D1−D2) is greater than or equal to first threshold T1, image processor 113 may control the intensity of image processing in accordance with the intensity function represented by Equation 2 to be described below.

$$F = a \times \log(D1 - D2 - T1)$$ Equation 1

Alternatively, image processor 113 may set, to zero, the intensity of image processing performed on each of the pixels in the specified region and/or its surroundings, when the difference between the remaining distance and the distance to a subject represented by each of such pixels is smaller than a second threshold. Image processor 113 may set the intensity of image processing to zero, when such difference is greater than a third threshold, and may set the intensity of image processing to greater than zero when such difference falls between the second threshold and the third threshold, inclusive. Note that the second threshold is smaller than the third threshold. In this case, pixels that represent a subject in a restricted region around the next guide point are subjected to image processing. This enables the user to visually recognize the subject located at the position of the next guide point on the processed image, and to readily recognize the position of the guide point. The second threshold may either be different from or identical to the first threshold.

When the above-described difference falls between the second threshold and the third threshold, inclusive, image processor 113 may control the intensity of image processing in accordance with an intensity function as represented by Equation 2 below. In Equation 2, F denotes the intensity of image processing, D1 denotes the distance from the vehicle to the subject represented by the pixels in the specified region and/or its surroundings, D2 denotes the remaining distance, T2 denotes the second threshold, and b denotes a coefficient. The control of the intensity of image processing in accordance with Equation 2 can correspond to the control to set the intensity of image processing to a lower level as the difference |D1−D2| is greater, i.e., as the position of the subject is close to and remote from the position distanced by the remaining distance. Image processing that is based on Equation 2 may be applied to an example of FIG. 3. Note that when the difference |D1−D2| falls between the second threshold and the third threshold, inclusive, image processor 113 may control the intensity of image processing in accordance with the intensity function represented by Equation 1 described above.

$$F = b \times (T2 - |D1 - D2|)$$ Equation 2

Figure 7A:
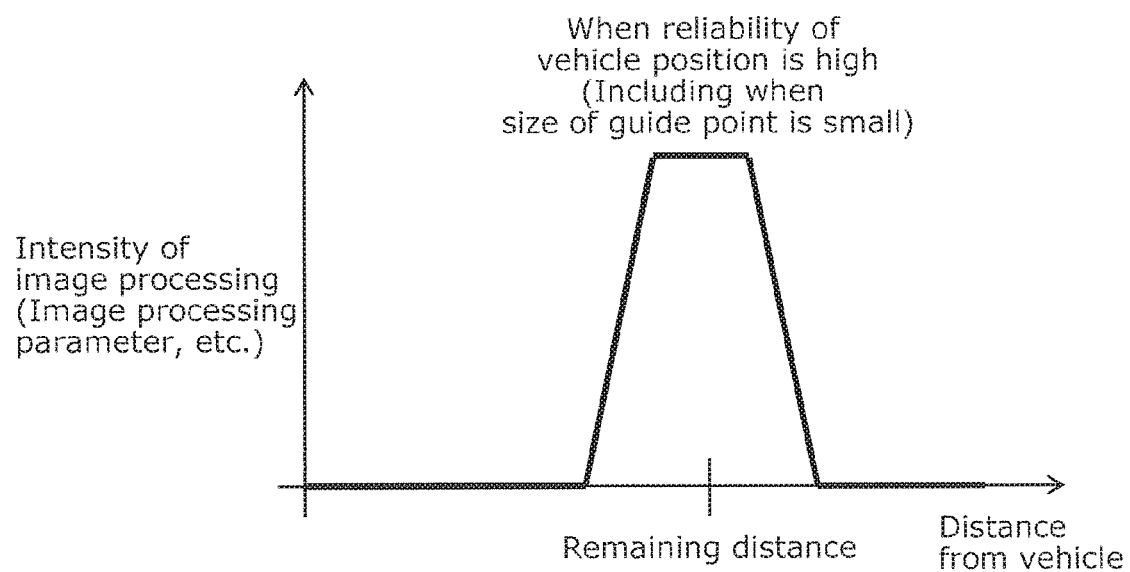
FIG. 7A is a diagram showing an exemplary relationship between the intensity of image processing and the distance to a subject in accordance with the reliability of the vehicle position.
Figure 7B:
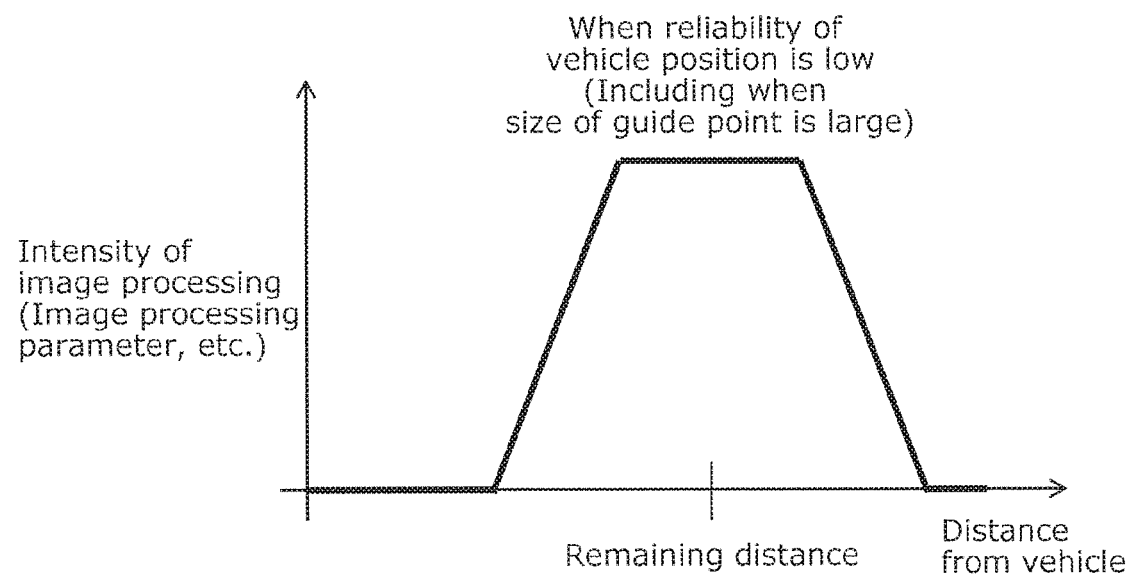
FIG. 7B is a diagram showing an exemplary relationship between the intensity of image processing and the distance to a subject in accordance with the reliability of the vehicle position.

Alternatively, image processor 113 may change the intensity of image processing in accordance with the reliability of the vehicle position. For example, image processor 113 may increase the size of a region on which image processing is performed at a higher intensity level to a greater size and increase the size of a specified region to a greater size, as the reliability of the vehicle position is lower. For example, as shown in FIG. 7A and FIG. 7B, image processor 113 may increase the size of a region on which image processing is performed at a higher intensity level to a greater size, as the reliability of the vehicle position is lower. Note that FIG. 7A and FIG. 7B show an exemplary relationship between the intensity of image processing and the distance to a subject in accordance with the reliability of the vehicle position. Also, image processor 113 may change the values of the first threshold, the second threshold, and the third threshold in accordance with the reliability of the vehicle position. For example, image processor 113 may set a smaller value as the first threshold, or may set a wider range as the range of the values between the second threshold and the third threshold, inclusive, as the reliability of the vehicle position is lower. In the latter case, image processor 113 may decrease the value of the second threshold and increase the value of the third threshold, or may change the value of only one of the second threshold and the third threshold.

Also, when the next guide point requires the direction of the route to change to right or left, image processor 113 may set different levels for the intensity of image processing performed on the specified region and/or its surroundings between a region located in the direction of the changed route and a region located in the opposite direction of the changed route. Stated differently, image processor 113 may set different levels for the intensity of image processing performed on each of the pixels in the specified region and/or its surroundings, in accordance with whether each of such pixels is located in the guide direction at the next point. For example, when the guide direction is right, image processor 113 may increase the intensity of image processing performed on those pixels in the specified region and/or its surroundings that are located rightward with respect to the center of the captured image or the specified region, compared to the intensity of image processing performed on those pixels in the specified region and/or its surroundings that are located leftward with respect to the center of the captured image or the specified region. This enables the user to readily recognize the guide direction at the next guide point on the processed image. Alternatively, image processor 113 may detect a road in the captured image from the map information and the image texture, etc., and set different levels, between the right-side and the left-side of the road with respect to the center, for the intensity of image processing performed on pixels in the specified region and/or its surroundings.

AR marker generator 102 obtains from second memory 40 guide information that corresponds to the captured image processed by image processor 113, generates an image of an augmented reality marker (also referred to as "AR marker"), which is a marker corresponding to the guide information, and outputs the generated image to image synthesizer 103. The time at which the captured image has been captured and the time at which the guide information has been generated are provided in the captured image and the guide information, and thus AR marker generator 102 can associate the captured image and the guide information with each other on the basis of such times. AR marker generator 102 may associate the captured image and the guide information with each other on the basis of ID information provided to each of the captured image and the guide information. AR marker generator 102 generates, as images of AR markers, images for guiding the vehicle, such as two arrows and "80 m" indicating the remaining distance as shown in FIG. 2, on the basis of the remaining distance to the next guide point, the position of the guide point, and the guide direction at the next point, and other information included in the guide information.

Image synthesizer 103 synthesizes the processed captured image obtained from captured image processor 101 with the images of the AR markers obtained from AR marker generator 102. In so doing, image synthesizer 103 synthesizes these images to superimpose the images of the AR markers onto the processed captured image. Image synthesizer 103 may determine the position of each of the AR markers to associate such position with the position of the next guide point on the processed captured image. Image synthesizer 103 outputs any of the synthesized images as shown in FIG. 3 to FIG. 5 to output unit 104. Output unit 104 converts the format of the synthesized image into an image format supported by display device 50, and outputs the resulting image to display device 50 to cause it to display the image.

The above-described structural components, such as distance calculator 12 of imaging device 10, position calculator 24, reliability generator 25, and guide information generator 26 of navigation device 20, and captured image processor 101, AR marker generator 102, image synthesizer 103, and output unit 104 of image processing device 100, may be implemented as a non-illustrated computer system that includes a processor such as a central processing unit (CPU) and a digital signal processor (DSP), and memories such as a RAM and a ROM. One or more, or all of the functions of the structural components may be achieved by executing a program in a ROM that has been recorded by a CPU or a DSP using a RAM as a work memory. Also, one or more, or all of the functions of the structural components may be implemented as a dedicated hardware circuit such as an electronic circuit or an integrated circuit. One or more, or all of the functions of the structural components may be achieved by a combination of the above-described software functionally and hardware circuits. The program may be provided, as an application, through communication via a communication network such as the Internet, through communication in compliant with a mobile communication standard, over a wireless network, a wired network, or by broadcasting, etc.

Figure 8:
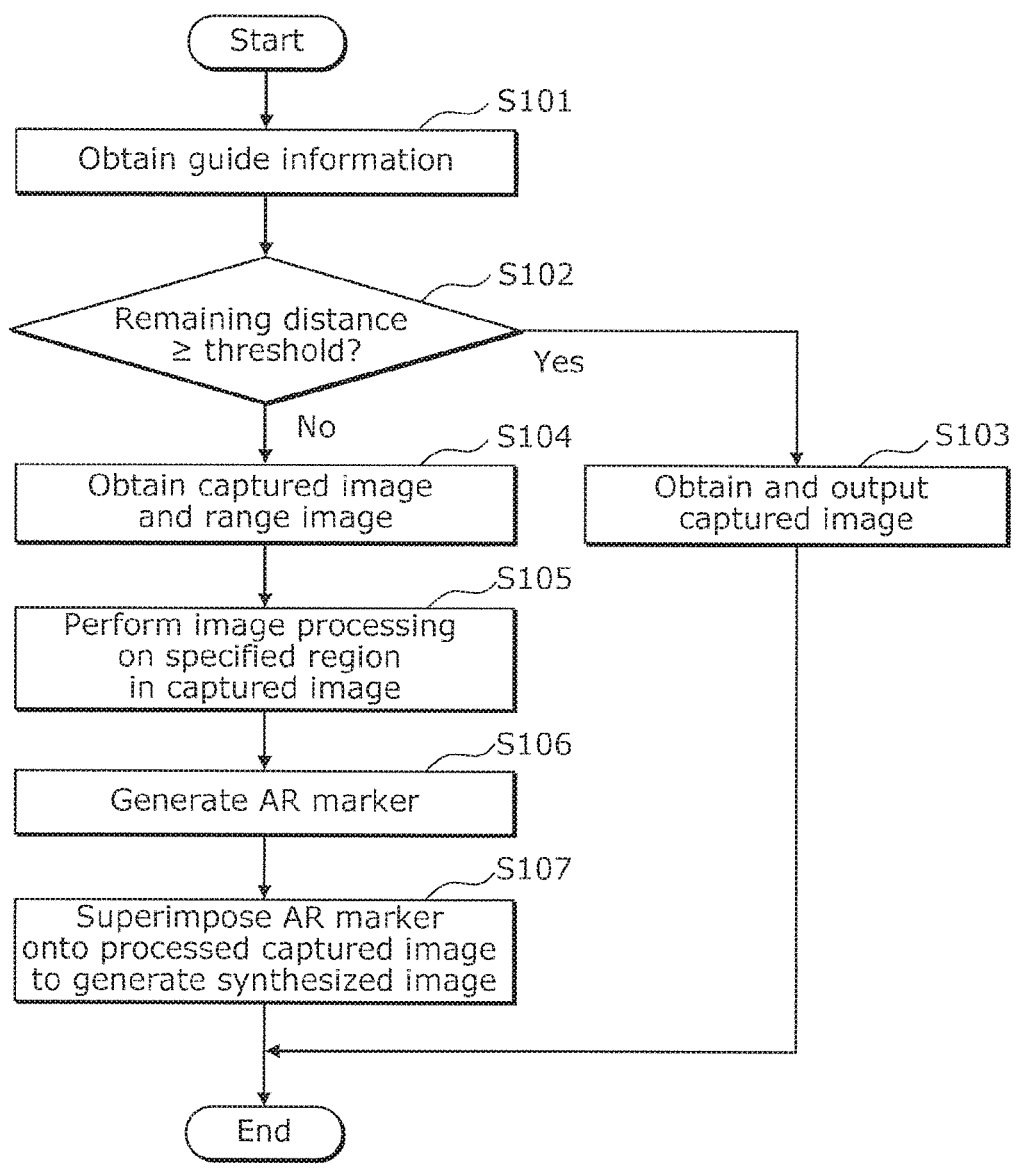
FIG. 8 is a flowchart of an exemplary operation performed by the image processing device according to Embodiment 1.

The operation performed by image processing device 100 according to Embodiment 1 will be described. FIG. 8 is a flowchart of an exemplary operation performed by image processing device 100 according to Embodiment 1. As shown in FIG. 8, in step S101, captured image processor 101 of image processing device 100 obtains via second memory 40 guide information generated by navigation device 20.

Next, in step S102, captured image processor 101 judges whether the remaining distance, included in the guide information, from the vehicle to the next guide point is greater than or equal to a fourth threshold. When the remaining distance is greater than or equal to the fourth threshold (Yes in step S102), captured image processor 101 proceeds to step S103 to obtain via first memory 30 the captured image generated by imaging device 10, outputs the captured image as it is to output unit 104, and causes display device 50 to display the captured image. When the remaining distance is less than the fourth threshold (No in step S102), captured image processor 101 proceeds to step S104.

Next, in step S104, captured image processor 101 obtains via first memory 30 the captured image that has been generated by imaging device 10 and that corresponds to the guide information, and a range image of the captured image.

Next, in step S105, captured image processor 101 extracts a specified region, in the range image, constituted by pixels that represent a subject located within a predetermined range from the remaining distance. Examples of the predetermined range include a range within plus or minus D meters from the remaining distance, a range within plus D meters from the remaining distance, and a range within minus D meters from the remaining distance. The size of D may be previously defined, or may be calculated by captured image processor 101 from the width of a road, etc. at a guide point based on the map information. The size of D is, for example, 5 meters to 10 meters. Captured image processor 101 further performs, on the pixels in the specified region and/or its surroundings in the captured image, image processing to control the edge strength of the subject in the specified region. Stated differently, captured image processor 101 performs image processing that enables the specified region in the captured image to be displayed in a state in which the driver, being a user, can readily recognize the specified region. Captured image processor 101 outputs the processed captured image to image synthesizer 103.

Next, in step S106, AR marker generator 102 of image processing device 100 obtains from second memory 40 the same guide information as obtained by captured image processor 101, generates an image of an AR maker on the basis of the guide information, and outputs the generated image to image synthesizer 103.

Next, in step S107, image synthesizer 103 generates an image obtained by synthesizing the processed captured image with the image of the AR marker to superimpose the image of the AR marker on the processed captured image. Image synthesizer 103 outputs the synthesized image to output unit 104 to cause display device 50 to display the synthesized image.

As described above, image processing device 100 according to Embodiment 1 controls the edge strength of a subject in a specified region in a captured image corresponding to the position distanced by the remaining distance, in accordance with the remaining distance to the next guide point. When the visual recognition of the position of the next guide point on a captured image is not easy due to, for example, a reason that the next guide point is remote, that an obstacle is present on the route to the next guide point, etc., image processing device 100 controls the edge strength of a subject in the specified region to enable the user to readily recognize the position of such next guide point. Image processing device 100 is thus capable of facilitating the visual recognition of a guide point on a captured image.

Variation of Operation Performed by Image Processing Device 100 According to Embodiment 1

Figure 9:
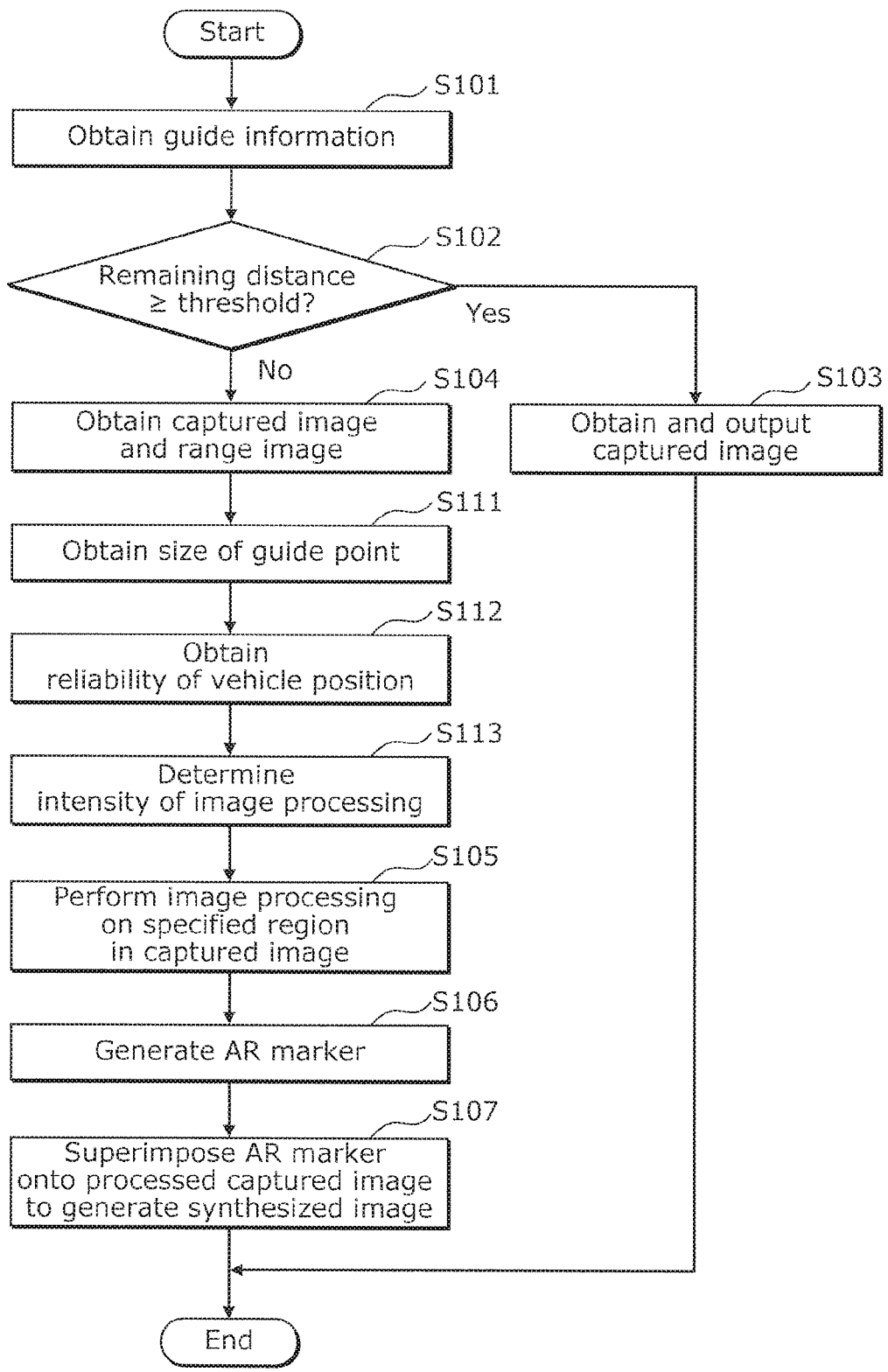
FIG. 9 is a flowchart of the operation performed by the image processing device according to a variation of Embodiment 1.

In the present variation, image processing device 100 performs image processing in accordance with the reliability, etc., of the vehicle position. FIG. 9 is a flowchart of the operation performed by image processing device 100 according to a variation of Embodiment 1. As shown in FIG. 9, image processing device 100 performs the processes of step S111 through step S113 in between step S104 and step S105. The processes of step S101 through step S104 are the same as the processes of Embodiment 1 described above.

In step S111 that follows step S104, captured image processor 101 obtains map information on the surroundings of the route outputted from navigation device 20 to second memory 40. Captured image processor 101 obtains the state of the next guide point on the map, i.e., the size of the guide point, on the basis of the map information on the surroundings of the route and the position of the next guide point included in the guide information. The size of the guide point is, for example, the width of the road at the guide point, the number of lanes, the width of the lanes, the size of an intersection, etc.

Next, in step S112, captured image processor 101 obtains the reliability of the vehicle position outputted from navigation device 20 to second memory 40.

Next, in step S113, captured image processor 101 determines the intensity of image processing to be performed on the captured image, on the basis of the size of the guide point and the reliability of the vehicle position. More specifically, captured image processor 101 determines the intensity of the image processing in accordance with a rule such as a function of processing intensity held beforehand. Equation 3 below is an example of the function of processing intensity. Note that in Equation 3, F(d) denotes the intensity of image processing, d denotes the difference between the remaining distance and the distance from the vehicle to a subject represented by pixels in a specified region and/or its surroundings. Such difference is an absolute value of the difference between these two distances. T denotes a distance threshold, X denotes the size of the guide point, and Y denotes the reliability of the vehicle position. a denotes a reflection coefficient of the size of the guide point, and b denotes a reflection coefficient of the reliability of the vehicle position. The control of the intensity of image processing in accordance with Equation 3 can correspond to the control of: setting the intensity of image processing to a lower level as difference d is greater; setting the intensity of image processing to a higher level as the size of the guide point is greater; and setting the intensity of image processing to a higher level as the reliability of the vehicle position is higher.

$$F(d)=(aX+bY)\times(T-d) \quad \text{Equation 3}$$

Next, in step S105, captured image processor 101 performs image processing on the specified region and/or its surroundings in the captured image, in accordance with the intensity of the image processing determined in step S113, and outputs the processed captured image to image synthesizer 103. The processes of step S106 and step S107 are the same as the processes of Embodiment 1.

As described above image processing device 100 according to the present variation is capable of controlling the intensity of image processing, in accordance with the state of a guide point on a map and the reliability of the vehicle position generated by navigation device 20. Image processing device 100 thus facilitates the visual recognition of a guide point on a captured image.

Embodiment 2

Image processing device 200 according to Embodiment 2 will be described. Image processing device 200 according to Embodiment 2 is different from Embodiment 1 in that AR marker generator 102 and image synthesizer 103 are not included. In Embodiment 2, the same structural components as those of Embodiment 1 are assigned the same reference marks as those assigned in Embodiment 1, and will not be described. The following mainly focuses on differences from Embodiment 1 and thus omits the description of the similar points described in Embodiment 1.

Figure 10:
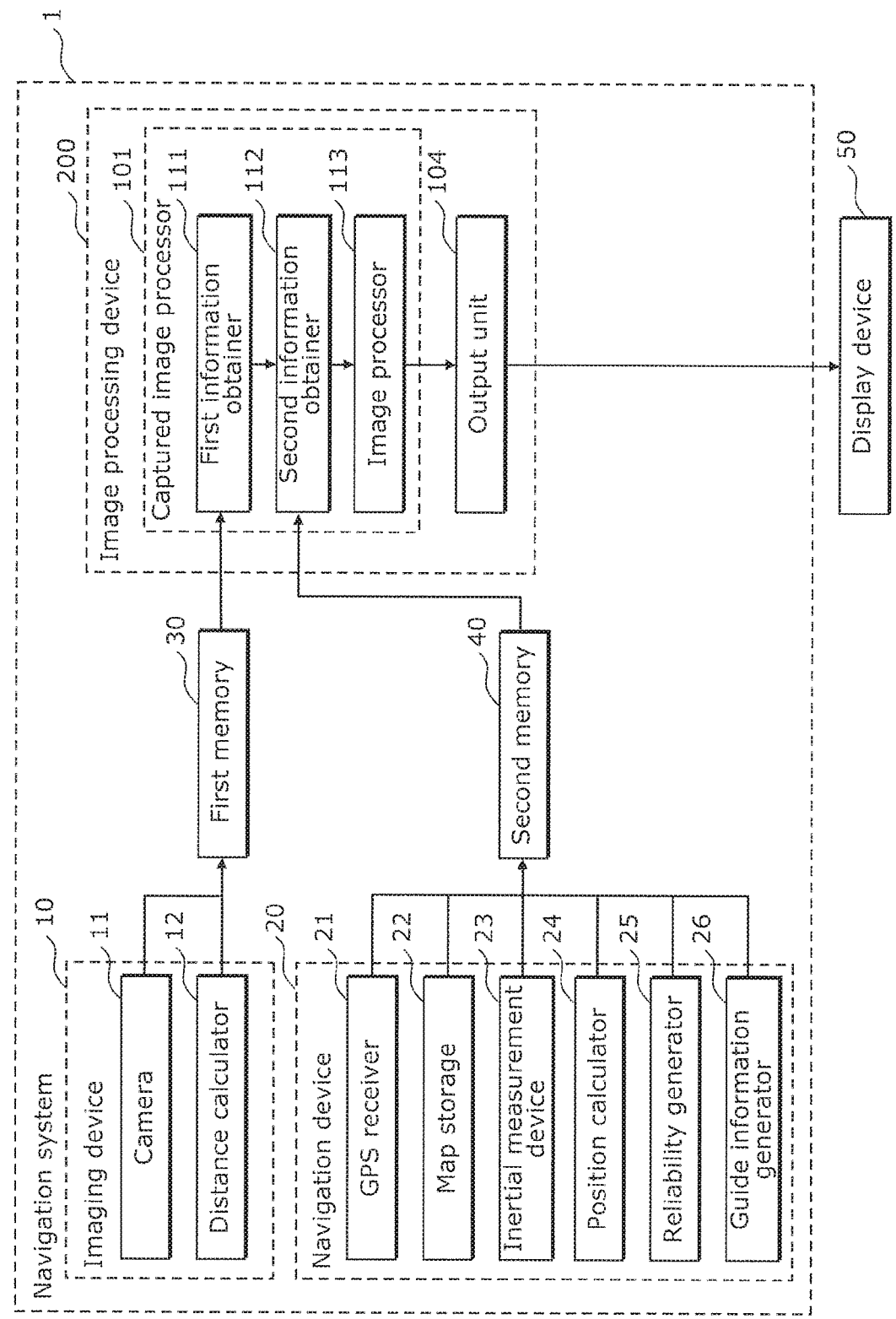
FIG. 10 is a block diagram of exemplary functional components of the navigation system that includes an image processing device according to Embodiment 2.

FIG. 10 is a block diagram of exemplary functional components of navigation system 1 that includes image processing device 200 according to Embodiment 2. Image processing device 200 includes captured image processor 101 and output unit 104. Captured image processor 101 performs image processing on a captured image obtained by imaging device 10 as in the case of Embodiment 1, and outputs the processed image to output unit 104. This means that image processing device 200 outputs the captured image processed by captured image processor 101 to display device 50 to cause it to display the image, without adding an AR marker on the image.

Figure 11:
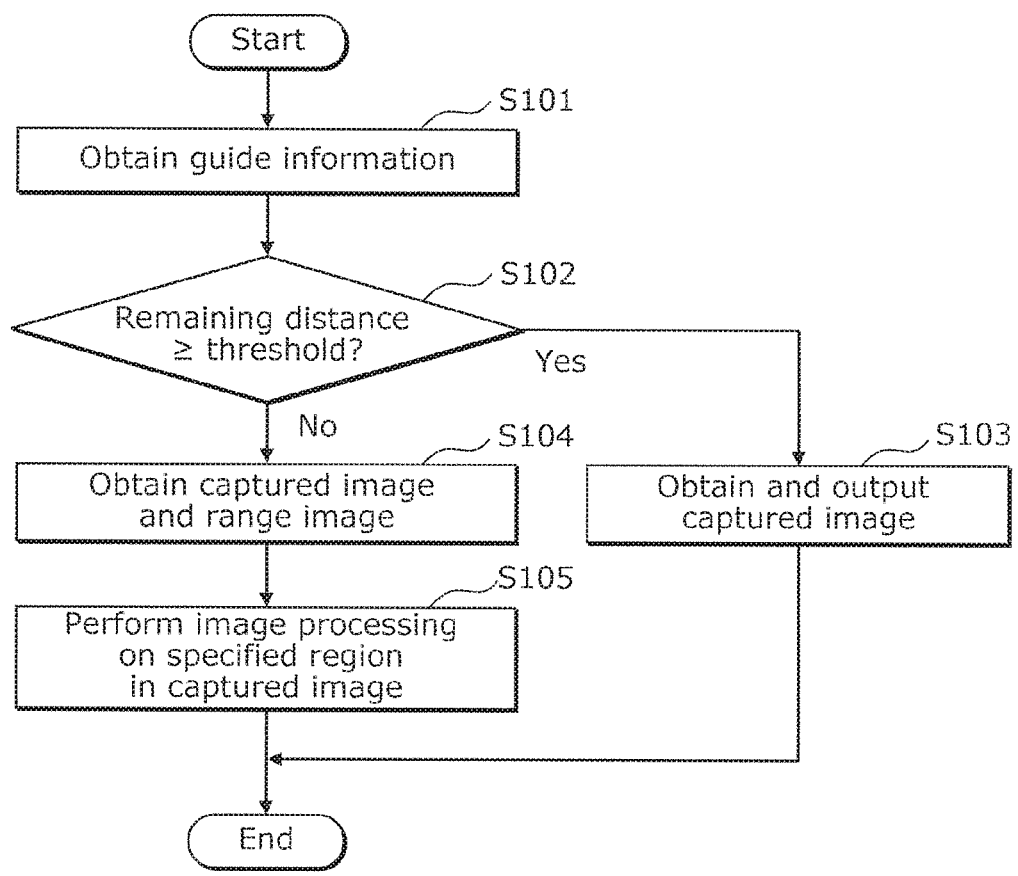
FIG. 11 is a flowchart of an exemplary operation performed by the image processing device according to Embodiment 2.

The operation performed by image processing device 200 according to Embodiment 2 will be described. FIG. 11 is a flowchart of an exemplary operation performed by image processing device 200 according to Embodiment 2. As shown in FIG. 11, image processing device 200 performs the same processes of step S101 through step S104 as those of Embodiment 1. In step S105, captured image processor 101 further performs image processing on a specified region and/or its surroundings in a captured image, as in the case of Embodiment 1, and further outputs the processed captured image to output unit 104 to cause display device 50 to display the image. Image processing device 200 according to Embodiment 2 described above provides the same effect as achieved by Embodiment 1.

Embodiment 3

Image processing device 300 according to Embodiment 3 will be described. Image processing device 300 according to Embodiment 3 is different from Embodiment 1 in that a distance calculator is included that calculates the distance to a subject in a captured image. In Embodiment 3, the same structural components as those of Embodiment 1 or Embodiment 2 are assigned the same reference marks as those assigned in Embodiment 1 and Embodiment 2, and will not be described. The following mainly focuses on differences from Embodiment 1 and Embodiment 2, and thus omits the description of the similar points described in Embodiment 1 and Embodiment 2.

Figure 12:
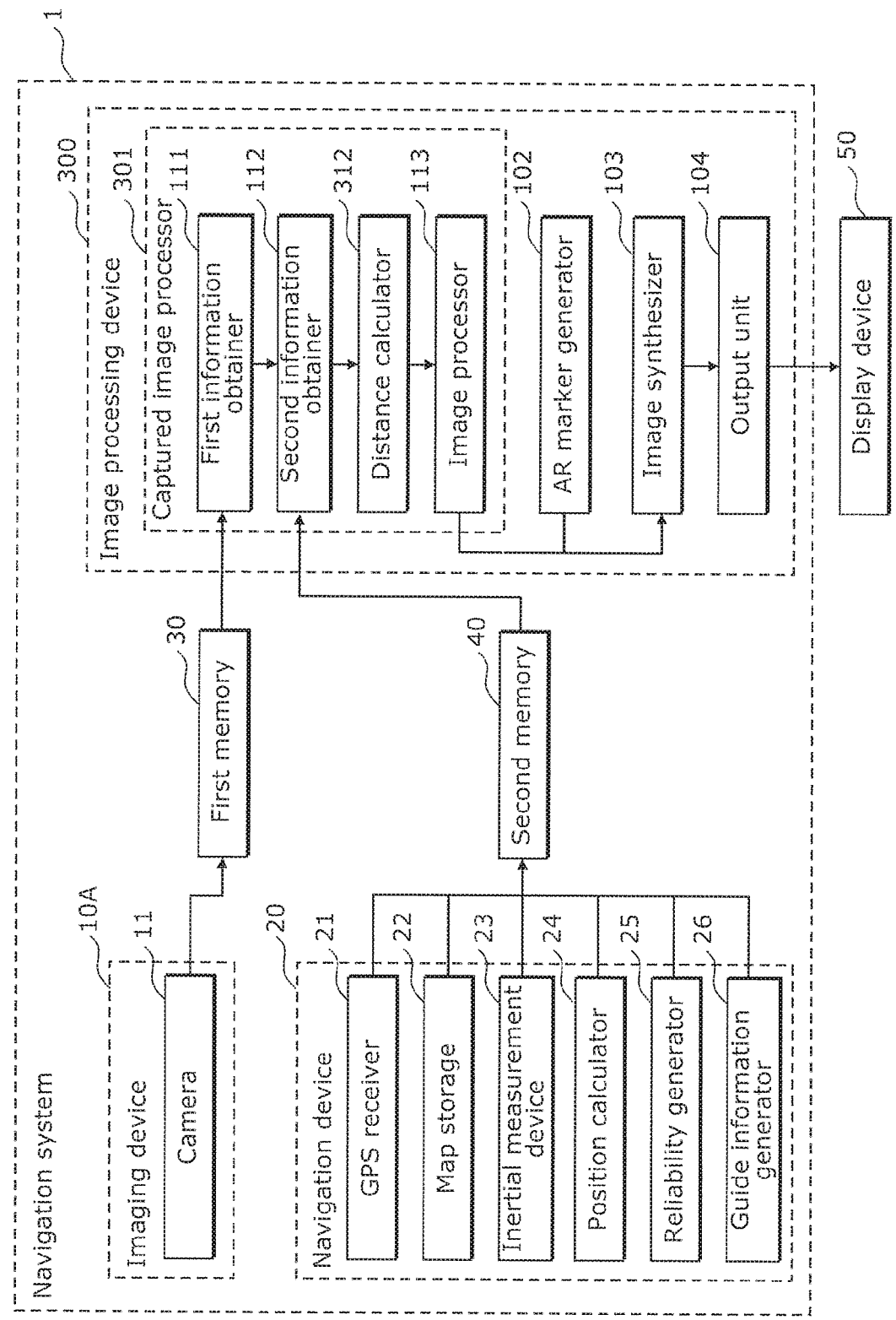
FIG. 12 is a block diagram of exemplary functional components of the navigation system that includes an image processing device according to Embodiment 3.

FIG. 12 is a block diagram of exemplary functional components of navigation system 1 that includes image processing device 300 according to Embodiment 3. Navigation system 1 includes imaging device 10A, navigation device 20, first memory 30, second memory 40, and image processing device 300. Imaging device 10A includes camera 11, and does not include a distance calculator. Image processing device 300 includes captured image processor 301, AR marker generator 102, image synthesizer 103, and output unit 104. Captured image processor 301 includes first information obtainer 111, second information obtainer 112, image processor 113, and distance calculator 312. Distance calculator 312 operates in a similar manner that distance calculator 12 of imaging device 10 according to Embodiment 1 operates. Distance calculator 312 calculates the distance between camera 11 and a subject represented by pixels of a captured image, i.e., the distance between the vehicle and the subject. Distance calculator 312 calculates such distance by estimating the position of a vanishing point, or by using the stereo algorithm. Distance calculator 312 outputs the calculated distance to image processor 113. Note that distance calculator 312 may estimate only the position of the vanishing point on the captured image, and image processor 113 may extract a specified region on the basis of the position of the vanishing point on the captured image. Here, distance calculator 312 is an example of the estimator.

Image processing device 300 according to Embodiment 3 described above provides the same effect as achieved by Embodiment 1. Furthermore, since image processing device 300 calculates the distance between a subject in a captured image and the vehicle, the application of a general-purpose imaging device to imaging device 10A is enabled. This allows image processing device 300 to be applied to a variety of navigation systems, and expands the versatility.

Embodiment 4

Image processing device 400 according to Embodiment 4 will be described. Image processing device 400 according to Embodiment 4 is different from Embodiment 1 in that road estimator 414 is included. In Embodiment 4, the same structural components as those of Embodiment 1, Embodiment 2, and Embodiment 3 are assigned the same reference marks as those assigned in Embodiment 1, Embodiment 2, and Embodiment 3, and will not be described. The following mainly focuses on differences from Embodiment 1, Embodiment 2, and Embodiment 3, and thus omits the descriptions of the similar points described in Embodiment 1, Embodiment 2, and Embodiment 3.

Figure 13:
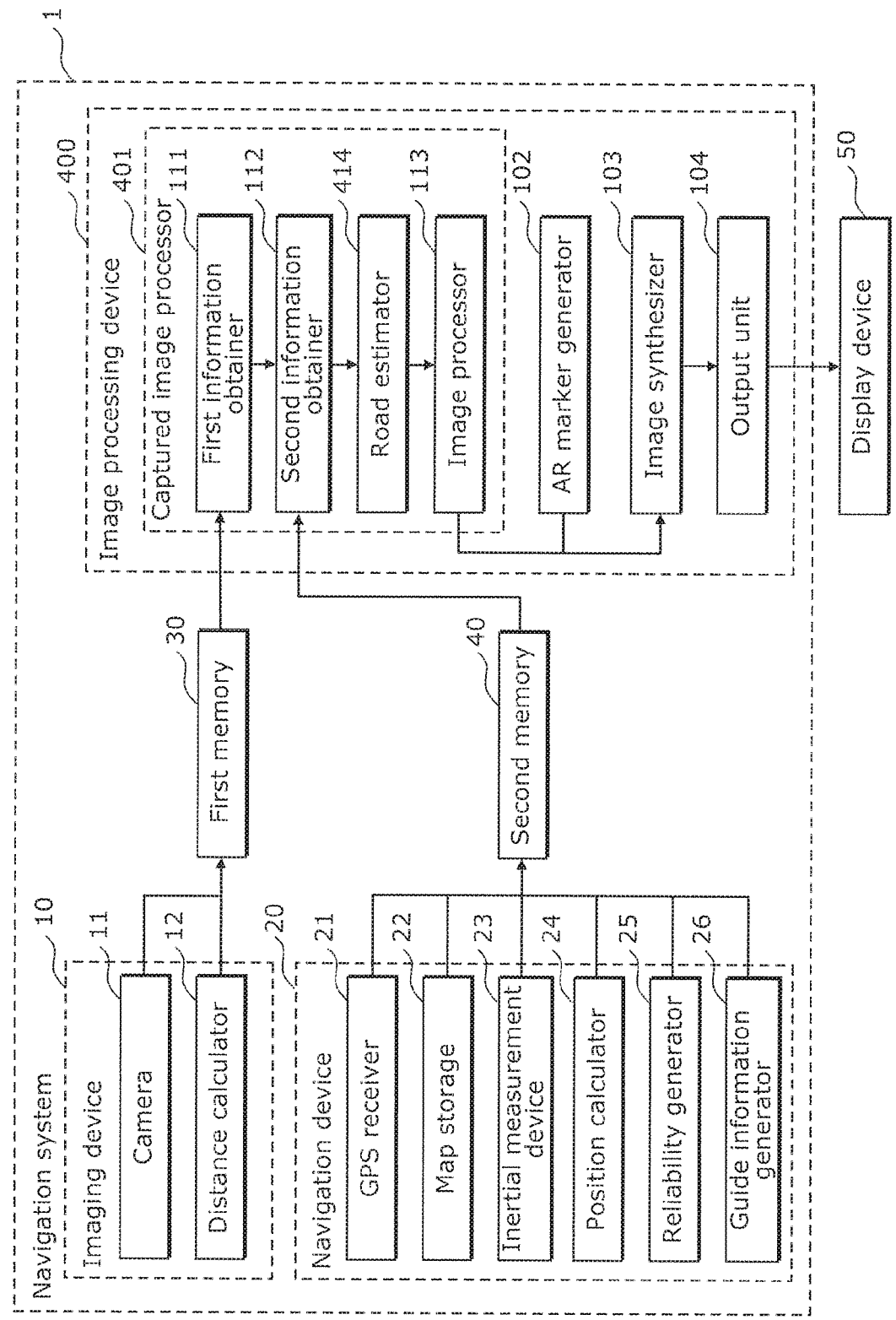
FIG. 13 is a block diagram of exemplary functional components of the navigation system that includes an image processing device according to Embodiment 4.

FIG. 13 is a block diagram of exemplary functional components of navigation system 1 that includes image processing device 400 according to Embodiment 4. Captured image processor 401 of image processing device 400 further includes road estimator 414 in addition to the components of captured image processor 101 according to Embodiment 1. Road estimator 414 obtains via second memory 40 the map information on the route outputted from navigation device 20. Road estimator 414 estimates a road region that is a region including roads around a guide point on a captured image, on the basis of the position of the guide point and the map information. Road estimator 414 may further estimate the size of the roads, an intersection, etc. in the road region. Road estimator 414 may estimate a lane in the road region. Road estimator 414 may also rank the roads that intersect at the intersection, when the guide point is such intersection, on the basis of the road standard, etc. included in the map information. Image processor 113 controls the edge strength of a subject in a specified region, in accordance with the positions of the right and left directions of the captured image in the road region estimated by road estimator 414. More specifically, image processor 113 changes the intensity of image processing performed on the specified region and/or its surroundings. In accordance with the size of the roads or intersection, lanes in the road region, and the rank of the roads (i.e., rank order), image processor 113 may change the intensity of image processing performed on regions that correspond to the positions of these roads, intersection, and lanes. In so doing, image processor 113 may change the thresholds in the above Equation 1 to Equation 3 to change the intensity of image processing.

Image processing device 400 according to Embodiment 4 described above provides the same effect as achieved by Embodiment 1. image processing device 400 is also capable of performing image processing in accordance with the state of a guide point on the map. For example, image processing device 400 is capable of controlling a region on which image processing is to be performed and the intensity of image processing in accordance with information on roads, such as the size of the roads or intersection, etc. at a guide point, the number of lanes of the roads, the road standard, etc. Image processing device 400 is thus capable of performing image processing that facilitates the visual recognition of the user, in accordance with the state of a guide point on the map.

Others

The image processing device, etc. according to one or more aspects of the present disclosure have been described on the basis of the embodiments and their variation, but the present disclosure is not limited to these embodiments and variation. Such one or more aspects of the present disclosure may include an embodiment achieved by making various modifications and alternations to the present disclosure that can be conceived by those skilled in the art without departing from the essence of the present disclosure, and an embodiment achieved by any combination of structural components described in different embodiments and variation.

As described above, the technology of the present disclosure may be implemented as a system, a device, a method, an integrated circuit, a computer program, or a computer-readable recording medium such as a recording disk, or may be implemented as any combination of a system, a device a method, an integrated circuit, a computer program, and a recording medium. Examples of the computer-readable recording medium include a non-volatile recording medium such as a CD-ROM.

For example, each of the processing units included in the above embodiments and variation may be implemented as a large-scale integration (LSI), which is typically an integrated circuit. These processing units may take the form of individual chips, or one or more or all of the processing units may be encapsulated into a single chip.

Such ICs are not limited to LSI. Each of the processing units thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory. Also, one or more, or all of the above structural components may take the form of a removable integrated circuit (IC) card or a single module. The IC card or module is a computer system that includes a microprocessor, a ROM, a RAM, etc. Such IC card or module may include the above-described LSI or system LSI. The microprocessor's operation in accordance with a computer program enables the IC card or module to accomplish its function. Such IC card and module may be tamper resistant.

The image processing method according to the present disclosure may be implemented as a processor such as a micro processing unit (MPU) and a CPU, a circuit such as an LSI, an IC card, or a single module, etc.

The technology of the present disclosure may be implemented as a software program or digital signals that form a software program, or may be a non-transitory, computer-readable recording medium on which a program is recorded. Such program can be distributed via a transmission medium such as the Internet.

The numerics used in the above description such as the ordinal number, quantity, etc. are all examples to specifically describe the technology of the present disclosure, and thus the present disclosure is not limited to such exemplary numerics. Also, the connection relationship among the structural components are mere examples to specifically describe the technology of the present disclosure, and thus a connection relationship required to achieve the function of the present disclosure is not limited to such exemplary connection relationship.

Also, the division of the functional blocks in the block diagrams is an example, and thus a plurality of functional blocks may be implemented as a single functional block, a single functional block may be divided into a plurality of blocks, or one or more functions may be moved to another functional block. Also, the functions of a plurality of functional blocks having similar functions may be processed by single hardware or software in parallel or in a time-shared manner.

While various embodiments have been described herein above, it is to be appreciated that various changes in form and detail may be made without departing from the spirit and scope of the present disclosure as presently or hereafter claimed.

Further Information About Technical Background to this Application

The disclosures of the following Japanese Patent Applications including specification, drawings and claims are incorporated herein by references on their entirety: Japanese Patent Application No. 2017-254585 filed on Dec. 28, 2017.

INDUSTRIAL APPLICABILITY

The technology of the present disclosure is effective for use as a technology that shows a target point on a captured image in a clear and easily recognizable manner.

The invention claimed is:

1. An image processing device, comprising:
  a processor; and
  a memory including a program that, when executed by the processor, causes the processor to perform operations, the operations including:
    obtaining a captured image from an imaging device that captures a view in front of a vehicle;
    obtaining a remaining distance to a next guide point;
    performing image processing on a subject in a specified region, the subject being in the captured image and different from the next guide point, the specified region corresponding to a position distanced from the vehicle in the traveling direction by the remaining distance; and
    outputting the captured image processed by the processor,
  wherein the processor controls an edge strength of the subject in the specified region, with the subject being located within a predetermined range from the position distanced by the remaining distance, in the traveling direction of the vehicle, and wherein the processor determines an intensity of the image processing based on a size of the next guide point and a reliability of a vehicle position.

2. The image processing device according to claim 1, wherein the operations further include:
  obtaining distance information on a distance to each of positions in the captured image, and
  the processor determines the specified region in accordance with the remaining distance, based on the distance information on the distance to each of the positions in the captured image.

3. The image processing device according to claim 2, wherein the image processor controls the edge strength of the subject in the specified region by performing the image processing at a higher intensity level as a difference between the remaining distance and a distance to a pixel to be processed that represents the subject becomes smaller.

4. The image processing device according to claim 2, wherein the processor controls the edge strength of the subject in the specified region by performing the image processing at a higher intensity level as a difference between the remaining distance and a distance to a pixel to be processed that represents the subject becomes greater.

5. The image processing device according to claim 2, wherein the processor controls the edge strength of the subject in the specified region by performing the image processing at an intensity level of zero when a difference between the remaining distance and a distance to a pixel to be processed that represents the subject is smaller than a threshold, and by performing the image processing at an intensity level greater than zero when the difference is greater than or equal to the threshold.

6. The image processing device according to claim 5, wherein the operations further include:
  obtaining information on reliability of a position of the vehicle detected by a navigation system of the vehicle equipped with the imaging device, and
  the processor changes a value of the threshold in accordance with the information on reliability.

7. The image processing device according to claim 5, wherein the operations further include:
  obtaining map information on the next guide point, and
  the processor changes a value of the threshold in accordance with the map information.

8. The image processing device according to claim 2, wherein the processor controls the edge strength of the subject in the specified region by performing the image processing at an intensity level of zero when a difference between the remaining distance and a distance to a pixel to be processed that represents the subject is smaller than a first threshold, and by performing the image processing at an intensity level greater than zero when the difference falls between the first threshold and a second threshold, inclusive.

9. The image processing device according to claim 1, wherein the operations further include:
estimating, from the captured image, distance information on a distance to each of positions in the captured image, and
the processor determines the specified region in accordance with the remaining distance, based on the distance information on the distance to each of the positions in the captured image.

10. The image processing device according to claim 1, wherein the operations further include:
estimating, from the captured image, a vanishing point in the captured image, and
the processor determines the specified region in accordance with the remaining distance, based on a relationship between each of positions in the captured image and the vanishing point.

11. The image processing device according to claim 1, wherein the processor controls the edge strength of the subject in the specified region by performing the image processing, the image processing being at least one of lightness change, color saturation change, edge enhancement, blurring, flashing, and flickering.

12. The image processing device according to claim 1, wherein the processor obtains a guide direction in which the vehicle is to be guided at the next guide point, and
the processor controls the edge strength of the subject in the specified region by performing the image processing at an intensity level that is changed in accordance with the guide direction.

13. The image processing device according to claim 1, wherein the operations further include:
estimating a road region that is a region including a road in the captured image, and
the processor controls the edge strength of the subject in the specified region in accordance with positions of left and right directions in the road region estimated by the road estimator.

14. The image processing device according to claim 1, wherein the operations further include:
obtaining guide information corresponding to the next guide point, and generating an augmented reality marker that is an image indicating the guide information; and
synthesizing the captured image processed by the processor with the augmented reality marker to superimpose and display the augmented reality marker on the captured image.

15. The image processing device according to claim 1, wherein the processor calculates a size of the predetermined range based on a width of a road at the next guide point.

16. The image processing according to claim 1, wherein the processor controls the intensity of the image processing in accordance with an intensity function, the intensity function being $$F = a \times \log(D1 - D2 - T1),$$

with a being a coefficient,
D1 being a distance from the vehicle to the subject,
D2 being the remaining distance, and
T1 being a predetermined threshold.

17. A display device that includes the image processing device according to claim 1, the display device displaying:
information outputted from a navigation system of the vehicle equipped with the imaging device; and
the captured image processed by the processor.

18. A navigation system that includes the image processing device according to claim 1, the navigation system outputting, to a display device, information for guiding the vehicle equipped with the imaging device, and the captured image processed by the processor, and causing the display device to display the information and the captured image.

19. An image processing method, comprising:
obtaining a captured image from an imaging device that captures a view in front of a vehicle;
obtaining a remaining distance to a next guide point;
performing, by at least one of a processor or a circuit, image processing on a subject in a specified region, the subject being in the captured image and different from the next guide point, the specified region corresponding to a position distanced from the vehicle in the traveling direction by the remaining distance; and
outputting the captured image on which the image processing has been performed;
wherein, in the image processing, an edge strength of the subject in the specified region is controlled, with the subject being located within a predetermined range from the position distanced by the remaining distance, in the traveling direction of the vehicle, and determining an intensity of the image processing based on a size of the next guide point and a reliability of a vehicle position.

* * * * *